(12) United States Patent
Ojima et al.

(10) Patent No.: US 9,239,970 B2
(45) Date of Patent: Jan. 19, 2016

(54) IMAGE FORMING SYSTEM

(71) Applicant: SHOWA ALUMINUM CAN CORPORATION, Shinagawa-ku, Tokyo (JP)

(72) Inventors: Shinichi Ojima, Tokyo (JP); Kazunori Ikeda, Tokyo (JP); Kenyu Muraoka, Tokyo (JP); Tetsuo Kashiwazaki, Tokyo (JP); Asumi Suwa, Tokyo (JP)

(73) Assignee: SHOWA ALUMINUM CAN CORPORATION, Tokyo (JP)

( * ) Notice: Subject to any disclaimer, the term of this patent is extended or adjusted under 35 U.S.C. 154(b) by 0 days.

(21) Appl. No.: 14/364,951

(22) PCT Filed: Dec. 21, 2012

(86) PCT No.: PCT/JP2012/083331
§ 371 (c)(1),
(2) Date: Jun. 12, 2014

(87) PCT Pub. No.: WO2013/099817
PCT Pub. Date: Jul. 4, 2013

(65) Prior Publication Data
US 2014/0368841 A1 Dec. 18, 2014

(30) Foreign Application Priority Data

Dec. 27, 2011 (JP) ................. 2011-286971
Jan. 17, 2012 (JP) ................. 2012-007092
Feb. 17, 2012 (JP) ................. 2012-033148
Dec. 4, 2012 (JP) ................. 2012-265254

(51) Int. Cl.
*B41F 17/22* (2006.01)
*G06K 15/02* (2006.01)
*B41F 17/20* (2006.01)

(52) U.S. Cl.
CPC .............. *G06K 15/021* (2013.01); *B41F 17/20* (2013.01)

(58) Field of Classification Search
USPC ................ 101/35, 36, 38.1, 40; 347/101, 102
See application file for complete search history.

(56) References Cited

U.S. PATENT DOCUMENTS 3,096,709 A 7/1963 Eldred et al.
3,195,451 A 7/1965 Hovekamp et al.
(Continued)

FOREIGN PATENT DOCUMENTS

CN 100999152 A 7/2007
EP 0968835 A2 1/2000
(Continued)

OTHER PUBLICATIONS

Communication dated Jan. 12, 2015, from the State Intellectual Property Office of People's Republic of China in counterpart Application No. 201280057393.9.
(Continued)

*Primary Examiner* — Lam Nguyen
(74) *Attorney, Agent, or Firm* — Sughrue Mion, PLLC

(57) ABSTRACT

An image forming system (100) is provided with plural image forming apparatuses (200) that form images on can bodies (10), a can-body supply mechanism (300) that supplies can bodies (10) to the plural image forming apparatuses (200) successively, and a can-body discharge mechanism (400) that discharges the can bodies (10) on which images have been formed by the image forming apparatuses (200). Each of the image forming apparatuses (200) receives, at a can-body receiving position (1C), can bodies (10) supplied by the can-body supply mechanism (300). Each of the image forming apparatuses (200) also discharges, at a can-body discharging position (1D), can bodies (10) on which images have been formed. The can-body receiving positions (1C) and the can-body discharging positions (1D) are arranged more to the inner side than a circular virtual line (1B) that passes through the centers of the image forming apparatuses (200).

5 Claims, 19 Drawing Sheets

(56) References Cited

U.S. PATENT DOCUMENTS

| | | | |
|---|---|---|---|
| 5,970,865 A * | 10/1999 | Horth | B41F 17/22 101/40 |
| 6,215,977 B1 | 4/2001 | Otani | |
| 6,769,357 B1 | 8/2004 | Finan | |
| 2004/0145785 A1 | 7/2004 | Manabe et al. | |
| 2005/0141919 A1 | 6/2005 | Kitajima et al. | |
| 2006/0137548 A1 | 6/2006 | Vetter | |
| 2007/0089619 A1 * | 4/2007 | Finan | B41J 3/4073 101/38.1 |
| 2007/0157559 A1 | 7/2007 | Till | |
| 2009/0133593 A1 * | 5/2009 | Till | B41J 11/002 101/35 |
| 2009/0145511 A1 | 6/2009 | Till | |
| 2010/0031834 A1 | 2/2010 | Morgavi et al. | |
| 2011/0179959 A1 | 7/2011 | Gerigk et al. | |
| 2014/0049585 A1 | 2/2014 | Tashiro et al. | |

FOREIGN PATENT DOCUMENTS

| | | | |
|---|---|---|---|
| EP | 1 225 053 A2 | 7/2002 | |
| JP | 61-32765 Y2 | 9/1986 | |
| JP | 2002-72597 A | 3/2002 | |
| JP | 2005-77684 A | 3/2005 | |
| JP | 2005-208622 A | 8/2005 | |
| JP | 2005-531428 A | 10/2005 | |
| JP | 2007-185960 A | 7/2007 | |
| JP | 2009-534265 A | 9/2009 | |
| JP | 2010-502489 A | 1/2010 | |
| JP | 2010-143200 A | 7/2010 | |
| WO | 03/106177 A2 | 12/2003 | |
| WO | 2010/034375 A1 | 4/2010 | |
| WO | 2011/018191 A1 | 2/2011 | |
| WO | 2012/147612 A1 | 11/2012 | |

OTHER PUBLICATIONS

International Search report for PCT/JP2012/083331 dated Apr. 2, 2013.

Extended European Search Report dated Nov. 27, 2015 issued in counterpart EP Application No. 12863457.3.

* cited by examiner

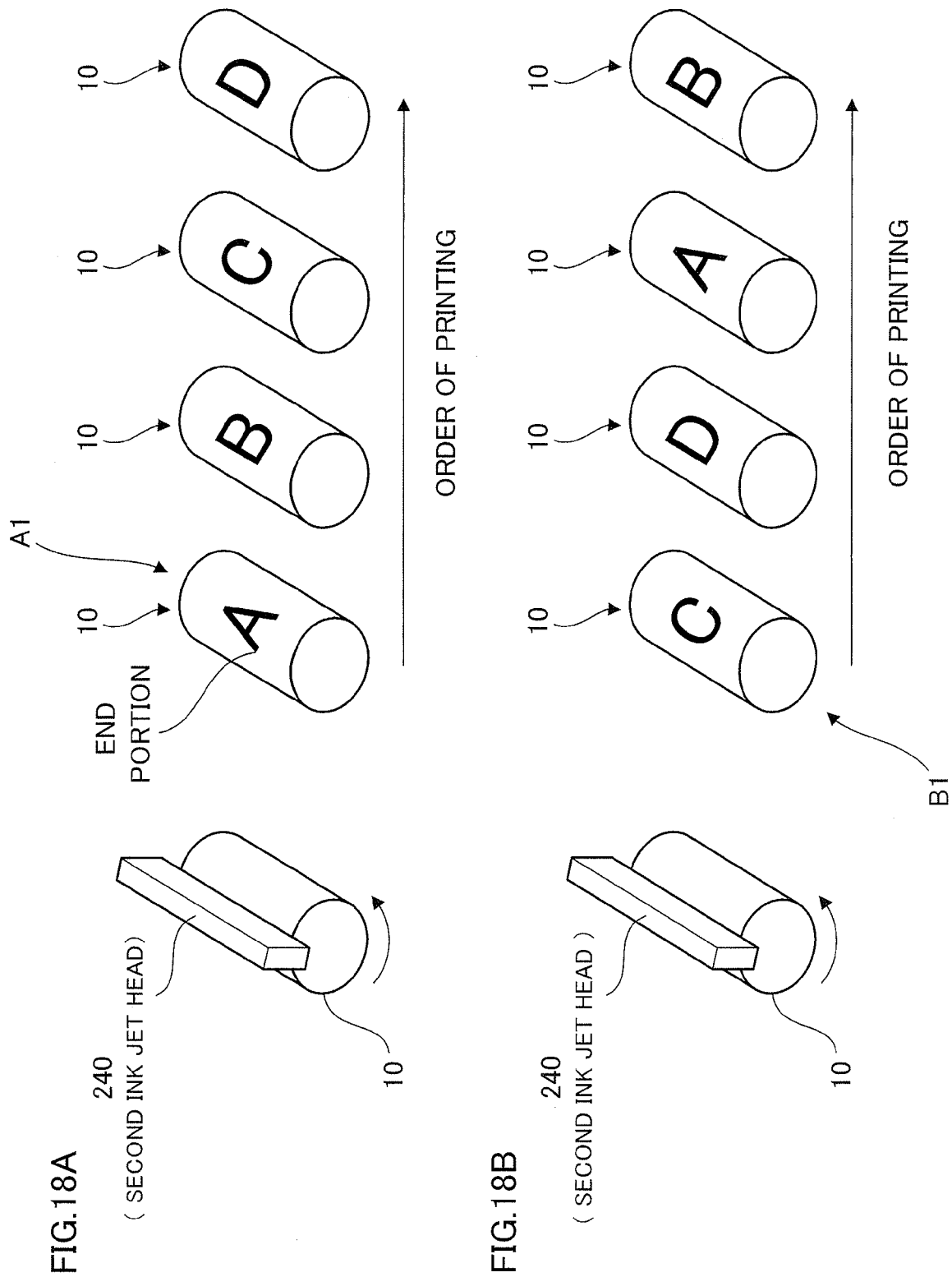

IMAGE FORMING SYSTEM

CROSS REFERENCE TO RELATED APPLICATIONS

This application is a National Stage of International Application No. PCT/JP2012/083331, filed on Dec. 21, 2012, which claims priority from Japanese Patent Application Nos. 2011-286971, filed on Dec. 27, 2011, 2012-007092, filed on Jan. 17, 2012, 2012-033148, filed on Feb. 17, 2012, and 2012-265254, filed on Dec. 4, 2012, the contents of all of which are incorporated herein by reference in their entirety.

TECHNICAL FIELD

The present invention relates to an image forming system.

BACKGROUND ART

A printing device is suggested, which includes plural digital print heads that are secured on a main body side of the device to form an image on a can body and a driving mechanism that conveys the can body and rotates the can body at a position facing the digital print heads (for example, refer to Patent Document 1).

Moreover, there is known a device for printing provided with a digital printing unit that sprays ink onto a surface of an offset blanket to form an ink image on the surface of the blanket and covers the whole circumference of a print target surface of a cylindrical print medium with a transferred image of the ink image (for example, refer to Patent Document 2)

CITATION LIST

Patent Literature

Patent Document 1: U.S. Published Application No. 2007/0089619
Patent Document 2: Japanese Unexamined Patent Application Publication (Translation of PCT Application) No. 2010-502489

SUMMARY OF INVENTION

Technical Problem

Here, in an image forming system provided with plural image forming apparatuses that form images on can bodies, can bodies are supplied to each image forming apparatus, and can bodies on which images have been formed are successively discharged from each image forming apparatus. By the way, in a case where can bodies are conveyed to each image forming apparatus by use of a conveying unit or can bodies successively discharged from each image forming apparatus are conveyed by a conveying unit, the image forming system has a large occupancy area depending on a route of the conveying unit.

An object of the present invention is to reduce an occupancy area of an image forming system provided with plural image forming apparatuses that form images on can bodies and a conveying unit that conveys the can bodies.

Moreover, in the image forming apparatus that forms an image on the can bodies, in some cases, image formation onto a can body is performed after inserting a can-body support member into the can body to support the can body.

By the way, in a case where a can body is attached to the can-body support member arranged along a direction intersecting a vertical direction, such as a horizontal direction, there occurs a need for attaching the can body from a lateral side of the can-body support member. In such a case, it is required to provide a supply device or the like that supplies the can body to the can-body support member on a lateral side of the can-body support member, and thereby the occupancy area of the image forming apparatus is apt to be increased. Moreover, when a can body is detached from the can-body support member arranged along the direction intersecting the vertical direction, there occurs a need for providing a conveying device or the like that conveys the detached can body on the lateral side of the can-body support member, and thereby the occupancy area of the image forming apparatus is apt to be increased.

An object of the present invention is to make an increase of the occupancy area of the image forming apparatus harder to occur, which is possibly caused, by arranging the can-body support member that supports the can body along a direction intersecting a vertical direction.

Moreover, in a case where, after an image is formed on an outer circumferential surface of a can body rotating in a circumferential direction by use of a coloring material of a first color, another image is formed by use of a coloring material of a second color, registration is performed between the image formed by the coloring material of the first color and the image formed by the coloring material of the second color in some cases. At this time, for example, if image formation of the first color is performed from a predetermined origin position and image formation of the second color is performed from the origin position, the registration can be carried out; however, in such a case, it takes time for arranging a can body at the origin position, and accordingly, a number of can bodies on which images can be formed per unit time is reduced.

An object of the present invention is to provide an image forming system capable of increasing a number of can bodies on which images can be formed per unit time.

Solution to Problem

An image forming system, to which the present invention is applied, includes: plural image forming apparatuses that cause a can body to make an orbital movement around a center of movement as a center, each of the plural image forming apparatuses including plural image forming portions that form an image onto the can body, being arranged in a state of including the plural image forming portions, and being arranged radially around a center of arrangement as a center; and a conveying unit that passes through each of the plural image forming apparatuses and conveys a can body discharged from each of the plural image forming apparatuses, wherein the conveying unit is provided to pass through a side closer to the center of arrangement than the center of movement of each image forming apparatus that constitutes the plural image forming apparatuses.

Here, each image forming apparatus that constitutes the plural image forming apparatuses and the conveying unit are provided so that the each image forming apparatus and the conveying unit partially overlap in a case where the image forming system is viewed from above. In this case, since the conveying unit is arranged to overlap the image forming apparatus, it becomes possible to make the occupancy area of the image forming system smaller.

Moreover, each of the plural image forming apparatuses receives a can body having been conveyed at a can-body receiving position and forms an image on the received can body, and the can-body receiving position provided in the each image forming apparatus that constitutes the plural image forming apparatuses is provided on a side closer to the center of arrangement. In this case, the conveying unit that conveys the can body to the can-body receiving position can be provided closer to the center of arrangement side relative to the can-body receiving position, and therefore, it becomes possible to further make the occupancy area of the image forming system smaller.

Moreover, each of the image forming apparatuses supports the can body before image formation is performed by inserting a can-body support member arranged along a vertical direction into an inside of the can body formed cylindrically, and after the support, displaces the can-body support member which supports the can body so that the can-body support member is along a direction intersecting the vertical direction to lay down the can body, forms an image on an outer circumferential surface of the can body by ejecting ink downward from above toward the can body in a lying state by each of the plural image forming portions, and after forming the image, displaces the can-body support member so that the can-body support member is along the vertical direction. In this case, it becomes possible to control the ink ejection positions more accurately, and it becomes possible to further make the occupancy area of the image forming system smaller.

Moreover, each of the plural image forming apparatuses is provided with a changing mechanism that changes orientation of the can body so that the can body in a standing state lies down, or changes orientation of the can body so that the can body in a lying state stands up. In this case, it becomes possible to increase the degree of freedom in arranging constituting members that constitute the image forming system.

Moreover, the changing mechanism is arranged inside of a virtual circle that passes through the center of movement provided in each of the plural image forming apparatuses that are arranged radially. In this case, as compared to a case where the changing mechanism is provided outside of the virtual circle, it becomes possible to make the occupancy area of the image forming system smaller.

Moreover, after supporting the can body before image formation is performed by the can-body support member, each of the image forming apparatuses moves the can body to pass through each image forming portion included in the plural image forming portions by causing the can-body support member to make an orbital movement around the center of movement as a center, and after movement of the can body, performs detachment of the can body from the can-body support member, and an attitude of the can-body support member is maintained constant during a period from a time when the support of the can body by the can-body support member is made until the detachment of the can body from the can-body support member is made by way of the orbital movement. In this case, as compared to a case where the attitude of the can-body support member is not maintained constant, it becomes possible to increase quality of the image formed on the can body.

From another point of view, an image forming system, to which the present invention is applied, includes: plural of image forming apparatuses that cause a can body to make an orbital movement around a center of movement as a center, each of the plural image forming apparatuses including plural image forming portions that form an image onto the can body, being arranged in a state of including the plural image forming portions, and being arranged radially around a center of arrangement as a center; and a conveying unit that passes through each of the plural image forming apparatuses and conveys a can body to each of the plural image forming apparatuses, wherein the conveying unit is provided to pass through a side closer to the center of arrangement than the center of movement of each image forming apparatus that constitutes the plurality of image forming apparatuses.

Here, each image forming apparatus that constitutes the plural image forming apparatuses and the conveying unit are provided so that the each image forming apparatus and the conveying unit partially overlap in a case where the image forming system is viewed from above. In this case, since the conveying unit is arranged to overlap the image forming apparatus, it becomes possible to make the occupancy area of the image forming system smaller.

From another point of view, an image forming system, to which the present invention is applied, includes: plural image forming apparatuses that are arranged radially around a predetermined center of arrangement as a center, form an image on a received can body, and discharge the can body on which the image has been formed; a first conveying unit that conveys a can body to a can-body receiving position provided in each of the plural image forming apparatuses; and a second conveying unit that conveys a can body discharged from a can-body discharging position provided in each of the plural image forming apparatuses, wherein the can-body receiving position and the can-body discharging position provided in each of the plural image forming apparatuses are provided on a side closer to the center of arrangement.

Here, each image forming apparatus that constitutes the plural image forming apparatuses and at least one conveying unit of the first conveying unit and the second conveying unit are provided so that the one conveying unit and the each image forming apparatus partially overlap in a case where the image forming system is viewed from above. In this case, since the conveying unit is arranged to overlap the image forming apparatus, as compared to a case where, for example, the conveying unit is installed outside of the image forming apparatus, it becomes possible to make the occupancy area of the image forming system smaller.

Moreover, at the can-body receiving position provided in each of the image forming apparatuses, receipt of the can body is performed by inserting a can-body support member arranged along a vertical direction into the can body formed cylindrically, and at the can-body discharging position provided in each of the image forming apparatuses, detachment of the can body from the can-body support member is performed by movement of the can body along a longitudinal direction of the can-body support member arranged along the vertical direction. In this case, it becomes possible to further make the occupancy area of the image forming system smaller.

Moreover, at the can-body receiving position provided in each of the image forming apparatuses, the can-body support member is inserted into an inside of the can body by moving the can body toward one direction from one of above and below the can-body support member arranged along the vertical direction, and at the can-body discharging position provided in each of the image forming apparatuses, the can body is detached from the can-body support member arranged along the vertical direction by moving the can body in the one direction. In this case, the first conveying unit and the second conveying unit are able to be arranged to be displaced in the vertical direction, and accordingly, it is possible to increase the degree of freedom in arranging the first conveying unit and the degree of freedom in arranging the second conveying unit.

Moreover, the second conveying unit includes plural suction members that move along a predetermined route while sucking the can body discharged from the can-body discharging position provided in each of the image forming apparatuses, and the sucking members perform the movement along a route formed in substantially an annular shape. In this case, as compared to a case where the suction members move along a route other than the route formed in substantially annular shape, it becomes possible to simplify a mechanism, such as providing a negative pressure inside the suction member.

Moreover, the first conveying unit conveys the can body to the can-body receiving position provided in each of the image forming apparatuses by use of a duct, and the duct is provided on a side closer to the center of arrangement than the can-body receiving position provided in each of the image forming apparatuses. In this case, as compared to a case where the duct is provided on a side opposite to the side where the center of arrangement is positioned, it becomes possible to further make the occupancy area of the image forming system smaller.

Moreover, each of the plural image forming apparatuses uses a digital printing method, and performs image formation onto the can body based on digital image information. In this case, flexible production, such as small-lot, high-variety production, can be carried out with ease.

Moreover, each of the plural image forming apparatuses is capable of forming an image different from one another onto the can body, and the image forming system further includes a sorting unit that sorts the can bodies conveyed by the second conveying unit by images formed on the can bodies. In this case, flexible production, such as small-lot, high-variety production, can be carried out with ease.

Moreover, an image forming system, to which the present invention is applied, includes: a first image forming portion that forms an image on an outer circumferential surface of a can body rotating in a circumferential direction; a first obtaining unit that obtains information related to rotation angle of the can body when image formation by the first image forming portion is started; a second image forming portion that forms an image on the can body rotating in the circumferential direction after the image is formed on the can body by the first image forming portion; a second obtaining unit that obtains information related to rotation angle of the can body when image formation by the second image forming portion is started; a data storing portion that stores image data of the image formed by the second image forming portion; and a determination unit that determines a starting position of reading of image data used by the second image forming portion based on the information related to the rotation angle obtained by the first obtaining unit and the information related to the rotation angle obtained by the second obtaining unit, wherein the second image forming portion forms an image on the outer circumferential surface of the can body rotating in the circumferential direction by use of the image data successively being read from the starting position of reading determined by the determination unit.

Here, the determination unit determines the starting position of reading based on an angle difference, which is a difference between a rotation angle specified by the information related to the rotation angle obtained by the first obtaining unit and a rotation angle specified by the information related to the rotation angle obtained by the second obtaining unit. In this case, it becomes possible to make a determination of the starting position of reading with more ease.

Moreover, a rotating unit that rotates the can body in the circumferential direction is further included, wherein the rotating unit rotates the can body with a constant speed, without increasing or decreasing the rotation speed of the can body, during a period from starting of image formation by the first image forming portion to completion of image formation by the second image forming portion. In this case, it is possible to suppress deterioration of accuracy in image forming positions that is possibly caused by increase or decrease of the rotation speed of the can body.

Moreover, the first image forming portion and the second image forming portion form an image on the outer circumferential surface of the can body by ejecting ink from above the can body in a lying state. In this case, as compared to a case where ink is ejected from the lateral side of the standing can body or a case where ink is ejected from beneath of the can body, it becomes possible to control the arrival positions of ink more accurately.

From another point of view, an image forming system, to which the present invention is applied, includes: the first image forming portion and the second image forming portion are arranged at positions different from each other, the image forming system comprises a moving unit that moves the can body to pass through each of the first image forming portion and the second image forming portion while rotating the can body in the circumferential direction, and the can body, which moves to pass through each of the first image forming portion and the second image forming portion while rotating in the circumferential direction, performs the movement while rotating with a constant speed without increasing or decreasing the rotation speed thereof. In this case, it is possible to suppress deterioration of accuracy in image forming positions that is possibly caused by increase or decrease of the rotation speed of the can body.

Advantageous Effects of Invention

According to the present invention, it is possible to reduce an occupancy area of an image forming system including plural image forming apparatuses that form images on can bodies and a conveying unit that conveys the can body.

Moreover, according to the present invention, increase of an occupancy area of the image forming apparatus, which possibly occurs, can be unlikely to occur by causing a can-body support member that supports the can body to be along a direction intersecting a vertical direction.

Moreover, according to the present invention, it is possible to provide an image forming system capable of increasing a number of can bodies on which images can be formed per unit time.

BRIEF DESCRIPTION OF DRAWINGS

FIGS. 18A and 18B are diagrams showing a process example of an image forming process on a can body.

DESCRIPTION OF EMBODIMENTS

Hereinafter, an exemplary embodiment according to the present invention will be described with reference to attached drawings.

Figure 1:
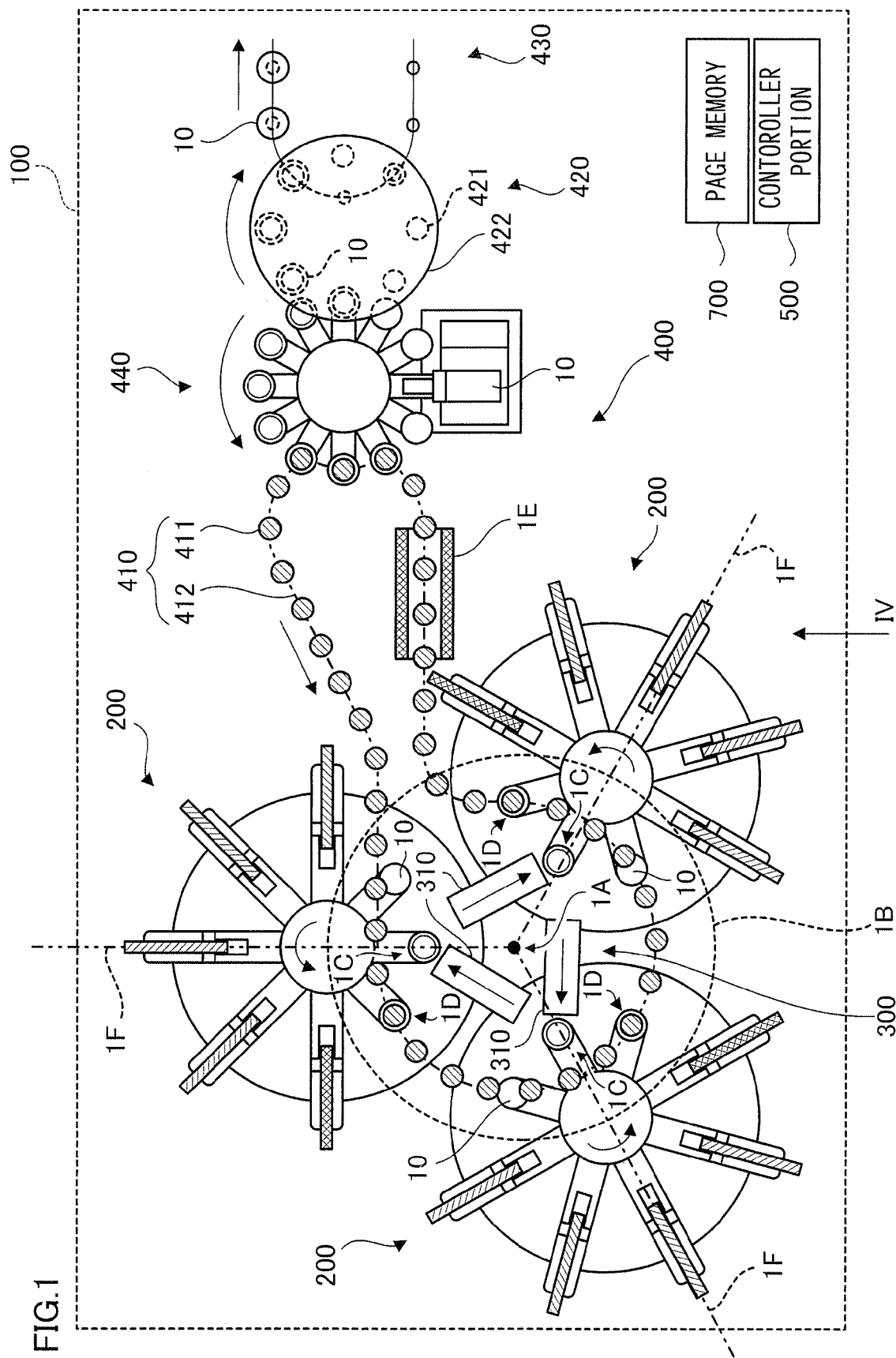
FIG. 1 is a diagram in a case where an image forming system is viewed from above.

FIG. 1 is a diagram in a case where an image forming system 100 is viewed from above.

The image forming system 100 in the exemplary embodiment forms an image onto a can body 10 used as a beverage can or the like based on digital image information. Here, the image forming system 100 is configured with plural image forming apparatuses 200 that perform image formation onto the can bodies 10 by use of an ink jet method, a can-body supply mechanism 300 that successively supplies the can bodies 10 manufactured in a not-shown can-body manufacturing process to the plural image forming apparatuses 200 and a can-body discharge mechanism 400 that discharges the can bodies 10 on which images have been formed by the image forming apparatuses 200. Moreover, the image forming system 100 includes a CPU or the like that executes a digital computing process in accordance with a predetermined processing program, and is provided with a controller portion 500 that performs control of each apparatus and each mechanism provided in the image forming system 100. Moreover, the image forming system 100 is provided with a page memory 700 that stores image data for the image formed on the can body 10 to be supplied to ink jet heads (described later) provided in the image forming apparatuses 200.

Here, in the exemplary embodiment, three image forming apparatuses 200 are provided, and image formation onto the can bodies 10 is performed in each of the image forming apparatuses 200. For this reason, in the exemplary embodiment, as compared to a case where image formation is performed onto the can bodies 10 by use of a single image forming apparatus 200, the number of can bodies 10 on which image formation is able to be performed per unit time is large. To describe further, the image forming apparatuses 200 in the exemplary embodiment perform image formation onto the can bodies 10 with a digital printing method; however, in the case of the digital printing method, it takes time to perform image formation, and it is hard to increase the number of the can bodies 10 on which image formation is performed per unit time. Accordingly, in the exemplary embodiment, plural image forming apparatuses 200 are set to perform image formation onto the can bodies 10 at plural locations.

Here, each of the three image forming apparatuses 200 is provided to a location corresponding to each vertex of a regular triangle (not shown). To describe further, the three image forming apparatuses 200 are arranged radially around a predetermined location (a location indicated by the reference sign 1A in the figure) as a center of arrangement. To describe further, the three image forming apparatuses 200 are arranged so that center portions thereof (centers of movement when the can bodies 10 are moved) are placed on a circular virtual line 1B. Moreover, each of the three image forming apparatuses 200 is provided on each of plural virtual straight lines 1F radially extending from the location indicated by the reference sign 1A in the figure as a center.

Moreover, each of the image forming apparatuses 200 receives the can body 10 supplied by the can-body supply mechanism 300 at a predetermined receiving position (a position indicated by the reference sign 1C in the figure, hereinafter, referred to as "can-body receiving position 1C" in some cases). Moreover, each of the image forming apparatuses 200 discharges the can body 10 on which the image has been formed at a predetermined discharging position (a position indicated by the reference sign 1D in the figure, hereinafter, referred to as "can-body discharging position 1D" in some cases). Here, the can-body receiving position 1C and the can-body discharging position 1D are arranged on inner side than the virtual line 1B. To additionally describe, the can-body receiving position 1C and the can-body discharging position 1D are provided on sides closer to the location indicated by the reference sign 1A than the above-described virtual line 1B.

Figure 4:
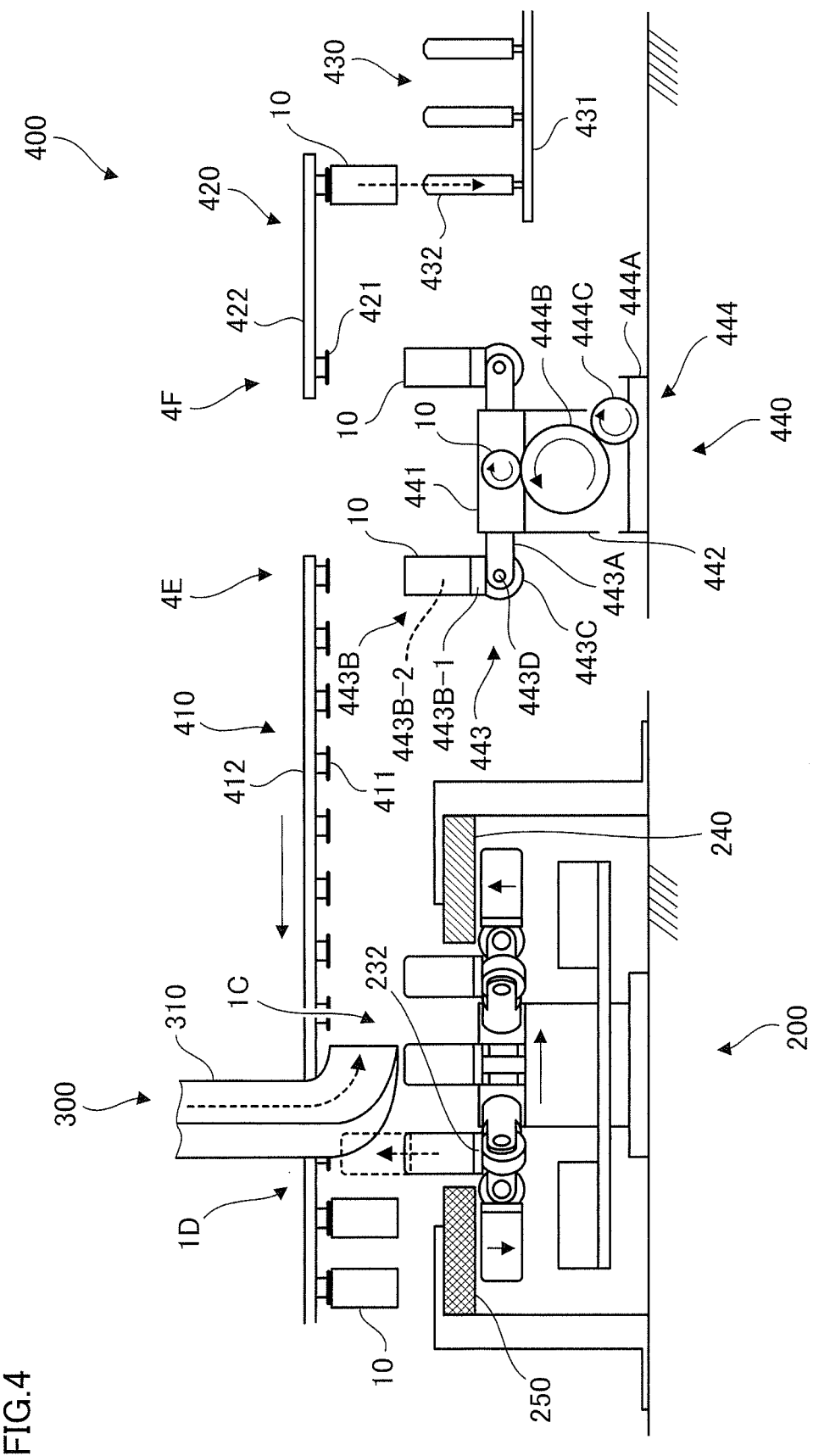
FIG. 4 is a diagram in a case where the image forming system shown in FIG. 1 is viewed from a direction of arrow IV.

Here, with reference to FIGS. 1 and 4, a description will be given of arrangement of the plural image forming apparatuses 200 and a first conveying mechanism 410, which is a second conveying unit, and the occupancy area of the image forming system. It should be noted that FIG. 4 is a diagram in a case of viewing the image forming system 100 shown in FIG. 1 from a direction of arrow IV. In the exemplary embodiment, the second conveying unit is arranged above each of the image forming apparatuses 200 (each image forming apparatus 200 and the second conveying unit are arranged to be partially overlapped in the case of viewing from above). In this manner, by arranging the first conveying mechanism 410, which is the second conveying unit, above the image forming apparatuses 200 to overlap thereof, it is possible to reduce the occupancy area of the image forming system 100 because two occupancy areas that should be owned independently can be integrated into one occupancy area.

Here, with reference to FIGS. 2A and 2B (diagrams for illustrating the image forming apparatus 200), a detailed description will be given of the image forming apparatus 200. It should be noted that FIG. 2A is a diagram in a case of viewing the image forming apparatus 200 from above, and FIG. 2B is a diagram in a case of viewing the image forming apparatus 200 from a direction of arrow IIB in FIG. 2A.

Figure 2A:
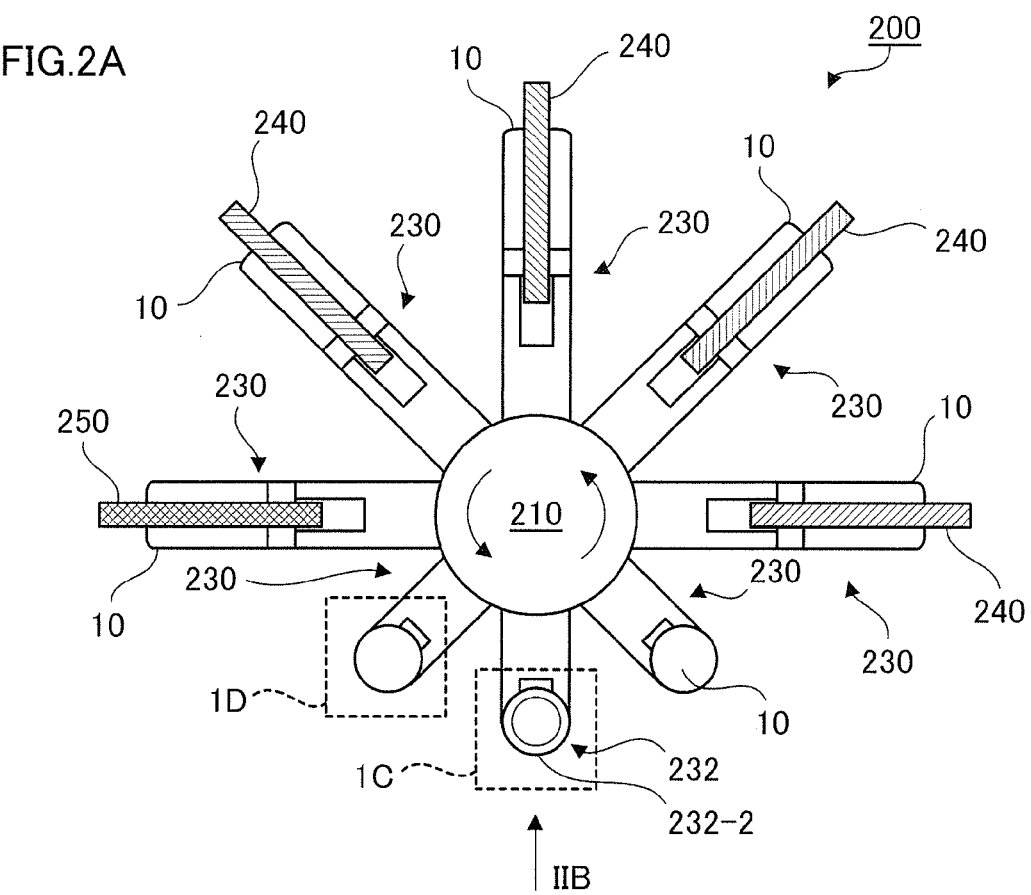
FIGS. 2A and 2B are diagrams for illustrating an image forming apparatus.
Figure 2B:
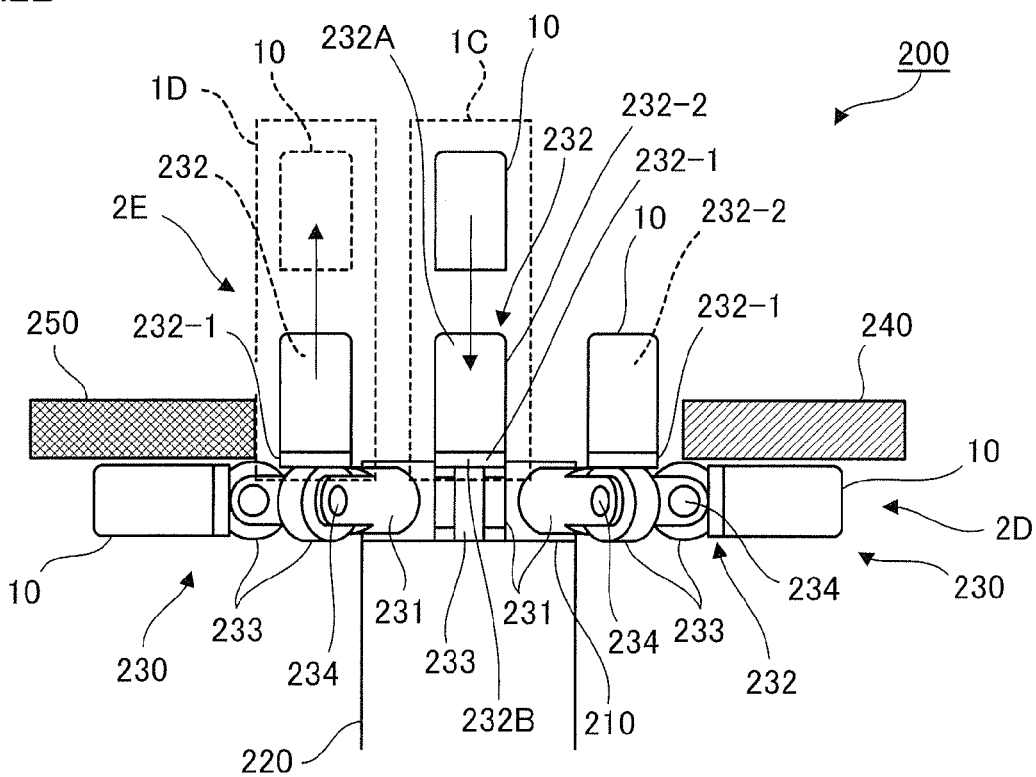

Each of the image forming apparatuses 200 includes, as shown in FIG. 2A, a rotating member 210 that is formed in a cylindrical-columnar shape and is driven by a not-shown motor to rotate in a direction of an arrow shown in the figure. Moreover, the image forming apparatus 200 is provided with, as shown in FIG. 2B, a support base 220 that supports the rotating member 210.

Further, as shown in FIG. 2A, the image forming apparatus 200 is provided with plural (8 in the exemplary embodiment) holding mechanisms 230 that are provided to protrude from an outer circumferential surface of the rotating member 210 in a rotating direction of the rotating member 210 at intervals of 45° to hold the can bodies 10 supplied by the above-described can-body supply mechanism 300. To additionally describe, each of the image forming apparatus 200 is provided with plural holding mechanisms 230 that are provided to protrude from an outer circumferential surface of the rotating member 210 and arranged radially around the rotating member 210 to hold the can bodies 10 supplied by the above-described can-body supply mechanism 300.

Moreover, the image forming apparatus 200 is provided with four ink jet heads 240, each of which ejects ink of an ultraviolet cure type onto an outer circumferential surface of the can body 10 held by the holding mechanism 230 to form an image. Here, in the exemplary embodiment, the can body 10 is moved to pass through the four ink jet heads 240, and thereby an image by inks of four colors is formed on the outer circumferential surface of the can body 10. Further, in the rotating direction of the rotating member 210, a UVLED (ultraviolet light emitting diode) lamp 250, which is provided on a downstream side of the four ink jet heads 240 and emits ultraviolet light to the outer circumferential surface of the can body 10 held by the holding mechanism 230, is provided. Further, there are provided plural head cleaners corresponding to the four ink jet heads 240, respectively, to clean the ink jet heads 240.

Here, each of the ink jet heads 240, as an example of an image forming portion and an ink ejecting portion, ejects ink of a different color from one another onto the can body 10. Moreover, the four ink jet heads 240 and the UVLED lamp 250 are provided adjacent with one another in the rotating direction of the rotating member 210. Moreover, the four ink jet heads 240 and the UVLED lamp 250 are arranged radially around the rotating member 210 in the rotating direction of the rotating member 210 at intervals of 45°.

Moreover, the four ink jet heads 240 and the UVLED lamp 250 are secured to a mounting surface on which the image forming system 100 is mounted to be in a resting state (refer to FIG. 4). It should be noted that the ink jet heads 240 can adopt a piezo system that ejects ink from a minute hole by a pressure generated by deforming a piezoelectric element or a thermal system that ejects ink from a minute hole by a vapor pressure, both of which belong to a category referred to as an on-demand type. It is possible to adopt another system belonging to a category referred to as a continuous type, which ejects ink by an electrical force or the like.

Here, as shown in FIG. 2B, each of the holding mechanisms 230 includes a securing member 231 that is provided to protrude from the outer circumferential surface of the rotating member 210, substantially arranged horizontally and secured to the rotating member 210. Further, the holding mechanism 230 includes a support cylinder (mandrel) 232, as an example of a can-body support portion, that is inserted into the can body 10 to support the can body 10. Here, the support cylinder (mandrel) 232 is configured with a base portion 232-1 and a rotating portion 232-2. In this case, the rotting portion 232-2 is mounted on the base portion 232-1, and a rotational shaft of a motor (not shown) mounted in the base portion 232-1 is connected to the rotating portion 232-2. Moreover, the base portion 232-1 is coupled to a disk-shaped member 233.

Here, the support cylinder 232 is formed in a cylindrical shape. Moreover, as shown in the center of FIG. 2B, the support cylinder 232 has one end portion 232A and the other end portion 232B. It should be noted that, in the exemplary embodiment, when the support cylinder 232 is inserted into the can body 10, insertion of the support cylinder 232 into the can body 10 is carried out with the one end portion 232A of the support cylinder 232 at the head. Moreover, in the exemplary embodiment, there are provided the disk-shaped member 233 attached to the other end portion 232B of the support cylinder 232 and a shaft 234 provided to pierce both of the disk-shaped member 233 and the securing member 231 for securing the disk-shaped member 233 to the securing member 231.

Here, in the exemplary embodiment, the disk-shaped member 233 is rotated around the shaft 234. Moreover, in the exemplary embodiment, though illustration will be omitted, a rotating mechanism that rotates the disk-shaped member 233 around the shaft 234 is provided. It should be noted that the rotating mechanism is able to be configured, for example, by arranging a worm wheel (not shown) inside the disk-shaped member 233 and arranging a worm (not shown) inside the securing member 231. In this case, it is possible to rotate the disk-shaped member 233 by rotating the worm inside the securing member 231 by a motor (not shown).

Moreover, in the exemplary embodiment, there is provided a servomotor, which is contained inside the base portion 232-1 and a rotational shaft of which is connected to the rotating portion 232-2 (the can body 10), to thereby function as a rotating unit that rotates the rotating portion 232-2 (the can body 10) in a circumferential direction. Here, in the exemplary embodiment, a rotating position (phase) of the rotational shaft of the servomotor is detected by a not-shown rotary encoder, and based on the detection result by the rotary encoder, an ejection starting timing of ink in each ink jet head 240 is controlled. This suppresses displacement between the images formed on the can body 10 by the respective ink jet heads 240.

Here, a description will be given of operations of the image forming apparatus 200 with reference to FIGS. 2A and 2B.

The image forming apparatus 200, first, receives the can body 10 conveyed by the can-body supply mechanism 300, as an example of a first conveying unit, at the can-body receiving position 1C shown in FIGS. 2A and 2B. Specifically, the can body 10 is conveyed to the can-body receiving position 1C by the can-body supply mechanism 300 shown in FIG. 1, and the support cylinder 232 provided to the image forming apparatus 200 is on standby at the can-body receiving position 1C. Thereafter, a drop of the can body 10 from the can-body supply mechanism 300 is carried out and suction of the can body 10 by the support cylinder 232 is carried out. Consequently, receipt of the can body 10 by the image forming apparatus 200 is achieved.

It should be noted that, in the exemplary embodiment, when the disk-shaped member 233 is rotated by the above-described rotating mechanism functioning as a part of a support member displacing unit and the can body 10 is received by the support cylinder 232, the support cylinder 232 is arranged so that a shaft center of the support cylinder 232 extends along the vertical direction. Then, receipt of the can body 10 by the support cylinder 232 is performed by insertion of the support cylinder 232 into an inside of the can body 10 that has moved from above.

Moreover, in the exemplary embodiment, at a tip of the one end portion 232A of the support cylinder 232, a ventilation hole (not shown) that leads to an inside of the support cylinder 232 is formed. Moreover, there are provided a suction device that sucks air inside the support cylinder 232 and a blowing device that blows air into the inside of the support cylinder 232, and thereby, due to suction carried out by the suction device, the inside of the support cylinder 232 is put under a negative pressure, to thereby perform suction of the above-described can body 10 through the ventilation hole. Moreover, by performing blowing of air by the blowing device, a pressure inside the support cylinder 232 is increased, and thereby a pressure inside the can body 10 is increased through the ventilation hole. Consequently, a force in a direction away from the support cylinder 232 acts on the can body 10, and accordingly, detachment of the can body 10 from the support cylinder 232 is achieved (described later).

It should be noted that the can body 10 in the exemplary embodiment is formed cylindrically. Moreover, in the can body 10, a bottom portion is formed at one end portion in the longitudinal direction, and the one end portion is in a closed state. On the other hand, the other end portion of the can body 10 is not closed and in an opened state. The support of the can body 10 by the support cylinder 232 is carried out by insertion of the support cylinder 232 into the inside of the can body 10 from the open side.

After support of the can body 10 by the support cylinder 232 is performed, rotation of the rotating member 210 that has been in a suspended state is carried out. This causes the can body 10 to make orbital movement around a center portion of the rotating member 210 in a diameter direction thereof as a center of movement. More specifically, the can body 10 comes to move in a counterclockwise direction in FIG. 2A. To describe further, by performing rotation of the rotating member 210 that functions as a part of the support member moving unit, the orbital movement of the support cylinder 232 is carried out, and the can body 10 is moved in the counterclockwise direction in the figure along with the orbital movement of the support cylinder 232.

Moreover, in the exemplary embodiment, after support of the can body 10 by the support cylinder 232 is performed, rotation of the rotating portion 232-2, which is a part of the support cylinder 232, is started, and thereby rotation of the can body 10 along the circumferential direction of the can body 10 is started (rotation of the can body 10). It should be noted that, in the exemplary embodiment, in a region positioned between the can-body receiving position 1C and the first ink jet head 240, acceleration (increase of the rotation speed) of the support cylinder 232 is performed, and the rotation speed of the support cylinder 232 reaches a predetermined rotation speed until the can body 10 arrives at the first ink jet head 240.

It should be noted that, in this specification, hereinafter, the ink jet head 240 positioned at the most upstream side in the rotation direction of the rotating member 210 is referred to as a first ink jet head 240. Moreover, another ink jet head 240 that is positioned at a downstream side of the first ink jet head 240 and adjacent to the first ink jet head 240 is referred to as a second ink jet head 240. Moreover, still another ink jet head 240 positioned adjacent to the second ink jet head 240 is referred to as a third ink jet head 240, and still another ink jet head 240 positioned adjacent to the third ink jet head 240 is referred to as a fourth ink jet head 240. Moreover, in a case where the first ink jet head 240 to the fourth ink jet head 240 are not particularly distinguished, the first ink jet head 240 to the fourth ink jet head 240 are simply referred to as the ink jet head 240 in some cases.

Further, in the exemplary embodiment, after support of the can body 10 by the support cylinder 232 is performed, the motor (not shown) contained inside the securing member 231 is driven, and the disk-shaped member 233 is rotated around the shaft 234. Consequently, in the exemplary embodiment, as indicated by a reference sign 2D in FIG. 2B, the support cylinder 232 comes to be along the horizontal direction (comes to be along a direction intersecting the vertical direction), and the can body 10 comes to a lying state. Thereafter, the can body 10 reaches below the first ink jet head 240 that functions as a first image forming portion, and the movement of the can body 10 (rotation of the rotating member 210) is suspended.

Then, from the first ink jet head 240, ink is ejected toward the can body 10 that is positioned below and rotates at a predetermined speed, and thereby an image with ink of a first color is formed onto the outer circumferential surface of the can body 10. Here, in the exemplary embodiment, ink is ejected toward the can body 10 from above the can body 10 in this manner. In this case, an operating direction of gravity comes to coincide with an ejecting direction of ink, and thereby behavior of the ejected ink becomes stable, to make it possible to control the ejection position of ink more accurately.

After that, in the exemplary embodiment, rotation of the rotating member 210 is restarted, and the can body 10 on which image formation by the first ink jet head 240 has been performed reaches below the second ink jet head 240. Then, when the can body 10 reaches below the second ink jet head 240, rotation of the rotating member 210 is suspended again. Thereafter, image formation with ink of a second color is performed by the second ink jet head 240.

It should be noted that, in the course of moving from the first ink jet head 240 to the second ink jet head 240 (in the course of moving from one ink jet head 240 to the other ink jet head 240, of the two ink jet heads 240 adjacent to each other), rotation of the can body 10 is able to be continuously performed, or rotation of the can body 10 is once suspended and restarted until reaching the second ink jet head 240. It should be noted that, in the case of suspending the rotation, there is a possibility that part of ink adhered to the can body 10 moves downward by gravity, to thereby cause uneven adherence of ink. For this reason, uneven adherence of ink hardly occurs in the case of continuous rotation.

Moreover, in the above description, the case where the can body 10 is rotated at a constant speed in the course of moving from the first ink jet head 240 to the second ink jet head 240 has been described; however, it is possible to increase the rotation speed of the can body 10 or to decrease the rotation speed of the can body 10 in the course of moving from the first ink jet head 240 to the second ink jet head 240.

After that, in the exemplary embodiment, moving of the can body 10 to the third ink jet head 240, image formation by the third ink jet head 240, moving of the can body 10 to the fourth ink jet head 240 and image formation by the fourth ink jet head 240 are carried out. Thereafter, the can body 10 moves to a position below the UVLED lamp 250, and the outer circumferential surface of the can body 10 is irradiated with ultraviolet light. Accordingly, ink adhered to the outer circumferential surface of the can body 10 is cured. It should be noted that, in the exemplary embodiment, the case where the UVLED lamp 250 is used has been described; however, a lamp, such as a metal halide lamp, can be used instead of the UVLED lamp 250. However, UVLED lamp 250 is compact and needs less power consumption.

It should be noted that, in the course of passing the can body 10 below the first ink jet head 240 to the fourth ink jet head 240 successively, it is preferable that rotation of the can body 10 is continued, without being suspended, and the can body 10 is rotated at a constant speed. To additionally describe, it is preferable that the can body 10 is moved (revolution) in a state where the rotation speed of the can body is not changed to keep a constant rotation speed. In a case of changing the rotation speed of the can body 10, control of the can body 10 becomes complicated and upsizing of machines is provoked (described in detail later).

Moreover, in the exemplary embodiment, a description has been given of the case where the UVLED lamp 250 is provided in each image forming apparatus 200; however, in a case where it is difficult to provide the UVLED lamp 250 in each image forming apparatus 200 in the interest of spacing or the like, it is possible to provide a single UVLED lamp 250 on a downstream side of three image forming apparatuses 200.

Moreover, in the exemplary embodiment, a description has been given of the case where the ink of the ultraviolet cure type is used; however, an ink of a thermal cure type can also be used, and in this case, it is possible to heat the can body 10 by installing a heater in place of the UVLED lamp 250, or, for example, it is possible to heat the can body 10 by the heater indicated by the reference sign 1E in FIG. 1. In this case, the can body 10 is heated, and thereby the ink on the surface of the can body 10 is cured.

After irradiation of the can body 10 with ultraviolet light is performed by the UVLED lamp 250, in the exemplary embodiment, as indicated by the reference sign 2E in FIG. 2B, the can body 10 is brought into a standing state. To specifically describe, the disk-shaped member 233 is rotated around the shaft 234 by the rotating mechanism, and the support cylinder 232 comes to stand. Then, the can body 10 also stands along with the standing. Thereafter, in the exemplary embodiment, the can body 10 is detached from the support cylinder 232 at the can-body discharging position 1D, and the detached can body 10 is held by the can-body discharge mechanism 400 as an example of the second conveying unit. After that, the can body 10 is conveyed by the can-body discharge mechanism 400.

Here, in the exemplary embodiment, as described above, the support cylinder 232 is arranged so that a shaft center of the support cylinder 232 is along the vertical direction when receipt of the can body 10 by the support cylinder 232 is carried out. Moreover, when the can body 10 is detached from the support cylinder 232, the support cylinder 232 is also arranged so that the shaft center of the support cylinder 232 is along the vertical direction.

Figure 3:
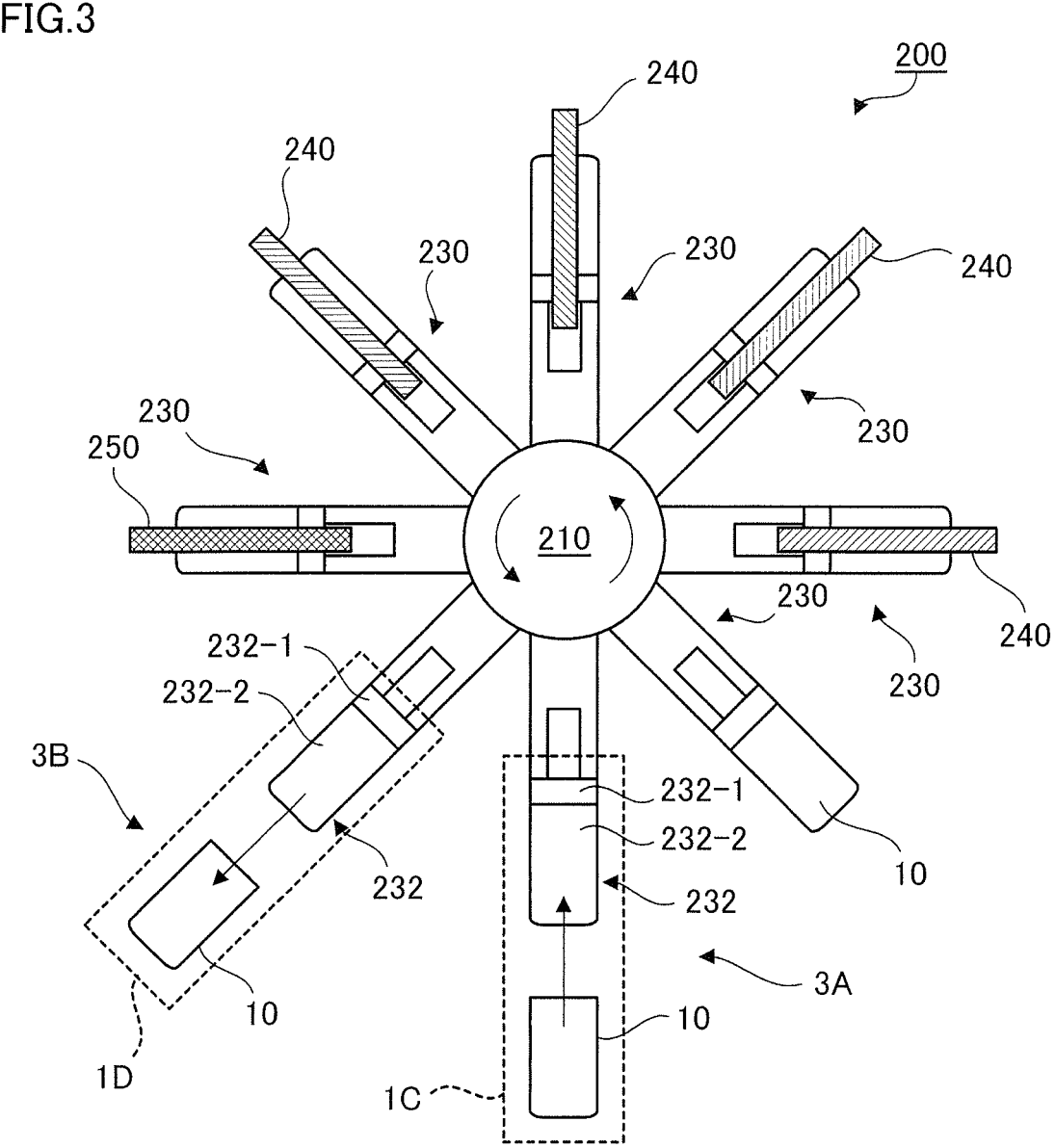
FIG. 3 is a diagram showing another configuration example of the image forming apparatus.

Here, when receipt of the can body 10 by the support cylinder 232 is carried out, as indicated by the reference sign 3A in FIG. 3 (a diagram showing another configuration example of the image forming apparatus 200), it is possible to keep the support cylinder 232 lying. Incidentally, in this case, there occurs a need for providing a supply device or the like that supplies the can body 10 to the support cylinder 232 on a lateral side of the support cylinder 232, and accordingly, the occupancy area of the image forming system 100 is apt to be increased. Moreover, when the can body 10 is detached from the support cylinder 232, as indicated by the reference sign 3B in FIG. 3, it is possible to keep the support cylinder 232 lying; however, in this case, there occurs also a need for providing a conveying device or the like that conveys the detached can body 10 on a lateral side of the support cylinder 232, and accordingly, the occupancy area of the image forming system 100 is apt to be increased.

On the other hand, in the case of configuration as described above, it is possible to locate a device for supplying the can body 10 (the can-body supply mechanism 300) above the support cylinder 232, and moreover, it is possible to locate a device for conveying the can body 10 (the can-body discharge mechanism 400) above the support cylinder 232. Consequently, in the case of the configuration in the exemplary embodiment, it is hard to increase the occupancy area of the image forming system 100. This can be easily presumed from the fact that the can-body receiving position 1C and the can-body discharging position 1D are arranged within a region indicated by the circular virtual line 1B shown in FIG. 1.

Next, a description will be given of the can-body supply mechanism 300 and the can-body discharge mechanism 400.

Figure 5:
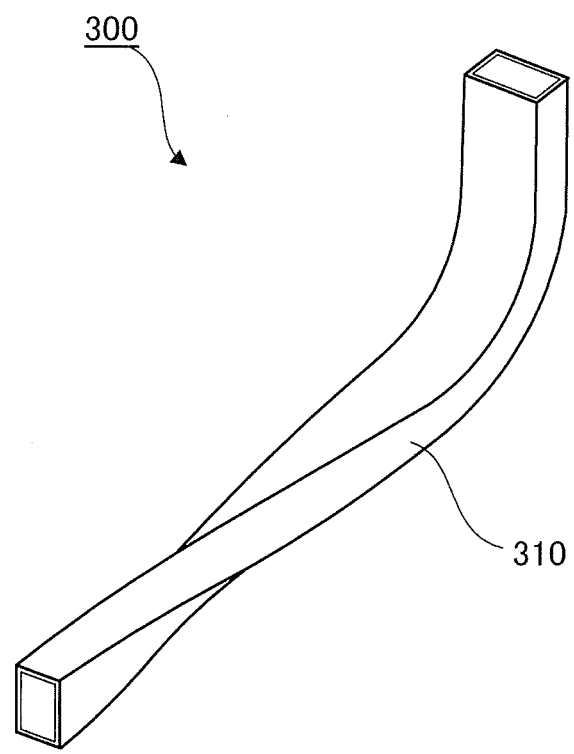
FIG. 5 is a diagram for illustrating a can-body supply mechanism.

FIG. 4 is a diagram in a case where the image forming system 100 shown in FIG. 1 is viewed from a direction of arrow IV. Moreover, FIG. 5 is a diagram for illustrating the can-body supply mechanism 300. It should be noted that, in FIG. 4, of the three image forming apparatuses 200 having been provided, illustration of two image forming apparatuses 200 positioned at a lower portion of FIG. 1 is omitted.

As shown in FIG. 4, the can-body supply mechanism 300 is arranged above the image forming apparatus 200 and supplies the can bodies 10 to the image forming apparatus 200 from above the image forming apparatus 200. Here, the can-body supply mechanism 300 includes a duct 310 arranged to head downward from above, and supplies the can bodies 10 to the image forming apparatus 200 by use of the duct 310. It should be noted that, as shown in FIG. 5, the duct 310 is formed in a state of being twisted 90°, to thereby supply the can body 10 conveyed in the lying state to the image forming apparatus 200 in the standing state.

It should be noted that, as shown in FIG. 1, the plural ducts 310 are provided corresponding to the respective image forming apparatuses 200. Further, as shown in FIG. 1, each of the ducts 310 is arranged on the inner side than the above-described circular virtual line 1B (refer to FIG. 1). To describe more, each of the ducts 310 is provided closer to a position indicated by the reference sign 1A (refer to FIG. 1) than the center portion of each image forming apparatus 200 (a position where the center portion of the rotating member 210 (refer to FIG. 2A) is located). Moreover, each of the ducts 310 is provided closer to the position indicated by the reference sign 1A than the can-body receiving position 1C.

Moreover, in the exemplary embodiment, not to cause the ducts 310 to interfere with one another, each of the ducts 310 does not head for the center portion of the circular virtual line 1B (the position indicated by the reference sign 1A), but is arranged in a state of being inclined with respect to a straight line heading for the center portion. To additionally describe, each of the ducts 310 is arranged in a state of being inclined with respect to a virtual line heading for the above-described center portion (the position indicated by the reference sign 1A) from the can-body receiving position 1C.

Next, the can-body discharge mechanism 400 will be described.

As shown in FIG. 4, the can-body discharge mechanism 400 is provided with: the first conveying mechanism 410 that is arranged above the image forming apparatus 200, holds and conveys the can body 10 on which an image has been formed in the image forming apparatus 200; a protecting layer forming device 440 that forms a protecting layer on the outer circumferential surface of the can body 10 conveyed by the first conveying mechanism 410; a second conveying mechanism 420 that conveys the can body 10 on which the protecting layer has been formed by the protecting layer forming device 440; and a third conveying mechanism 430 that receives the can body 10 from the second conveying mechanism 420 and conveys the can body 10.

Here, the first conveying mechanism 410 includes, as shown in FIG. 4, plural holding pads 411 that suck and hold the can bodies 10 and an upper support member 412 that is provided above the holding pads 411 to support the holding pads 411 from above. Here, the upper support member 412 is, as shown in FIG. 1, provided to make a circulating movement along a predetermined route. Moreover, the upper support member 412 is, as shown in FIG. 1, provided through the can-body discharging position 1D provided to each of the three image forming apparatuses 200. Moreover, the upper support member 412 is, as shown in FIG. 1, provided to pass through the inner side of the above-described circular virtual line 1B. To additionally describe, the upper support member 412 is provided to pass through the side closer to the position indicated by the reference sign 1A (refer to FIG. 1) than the center portion of each of the image forming apparatuses 200 (the center portion of the rotating member 210).

It should be noted that, in the exemplary embodiment, a description has been given by taking the case where the first conveying mechanism 410 is provided to pass through the can-body discharging position 1D provided to each of the three image forming apparatuses 200 as an example; however, it is also possible to provide the can-body supply mechanism 300 to pass through the can-body receiving position 1C provided to each of the three image forming apparatuses 200. To additionally describe, the can-body supply mechanism 300 is also configured with, for example, the holding pads and the upper support member arranged to pass through the can-body receiving position 1C provided to each of the three image forming apparatuses 200. It should be noted that, in the case of configuring the can-body supply mechanism 300 with the holding pads and the upper support member, similar to the first conveying mechanism 410, it is preferable to provide the upper support member so that the holding pads pass through inside the circular virtual line 1B. To additionally describe, it is preferable to provide the upper support member so that the holding pads pass through a side closer to the position indicated by the reference sign 1A (refer to FIG. 1) than the center portion of each image forming apparatus 200 (the center portion of the rotating member 210).

Here, in the exemplary embodiment, the can body 10 on which image formation by the image forming apparatus 200 has been performed is held by the above-described holding pad 411 when the can body 10 arrives at the can-body discharging position 1D (refer to FIG. 4).

Specifically, when the can body 10 arrives at the can-body discharging position 1D, instead of suction carried out so far for securing the can body 10 to the support cylinder 232, supply of air, in which a pressure is increased, to a space inside the support cylinder 232 is performed, and thereby the highly-pressured air flows into a gap between the support cylinder 232 and the can body 10 through the ventilation hole that pierces the inside and the outer surface of the support cylinder 232, and accordingly, the pressure in the space is increased, to thereby cause a force for separating from the support cylinder 232 to act on the can body 10. Accordingly, the can body 10 supported by the support cylinder 232 comes to move upwardly. On the other hand, the holding pad 411 also starts suction. Accordingly, the can body 10 comes to be held by the holding pad 411. Moreover, by providing a function (not shown) to move the holding pads 411 vertically, the holding pad 411 moves downward to the support cylinder 232 and starts suction, and on the other hand, the support cylinder 232 breaks (switches from a negative pressure to a positive pressure) suction of the can body 10, to thereby accelerate movement of the can body 10 from the support cylinder 232 to the holding pad 411, and moreover, by causing the holding pad 411 to move upward after the holding pad 411 sucks the can body 10, the can body 10 is detached from the support cylinder 232 and moves to the holding pad 411, to thereby enable the can body 10 to be held by the holding pad 411. It should be noted that the can body 10 held by the holding pad 411 moves along the movement of the upper support member 412, and reaches the protecting layer forming device 440.

It should be noted that, in the first conveying mechanism 410, the holding pad 411 is forwarded by intermittent feeding of 3-pitch feeding. To additionally describe, in the first conveying mechanism 410, in a case of assuming that an interval between one holding pad 411 and the other holding pad 411 that are adjacent to each other is 1 pitch, an amount of forwarding the holding pad 411 at one time is 3 pitches. To describe further, in the exemplary embodiment, the amount of forwarding the holding pad 411 at one time is set at "3", which is the same number as the number of installation of the image forming apparatuses 200.

Moreover, in the exemplary embodiment, the number of holding pads 411 positioned between the can-body discharging position 1D in one image forming apparatus 200, of the three image forming apparatuses 200 having been provided, and the can-body discharging position 1D in an image forming apparatus 200 adjacent to the one image forming apparatus 200 (an image forming apparatus 200 positioned on a downstream side of the one image forming apparatus 200 in the conveying direction of the can bodies 10) (hereinafter, referred to as "number between adjacent apparatuses") is a natural multiple of the number of installed image forming apparatuses 200. Specifically, in the exemplary embodiment, the number between adjacent apparatuses is 6 that is a natural multiple of 3, which is the number of installed image forming apparatuses 200, as shown in FIG. 1.

Figure 6:
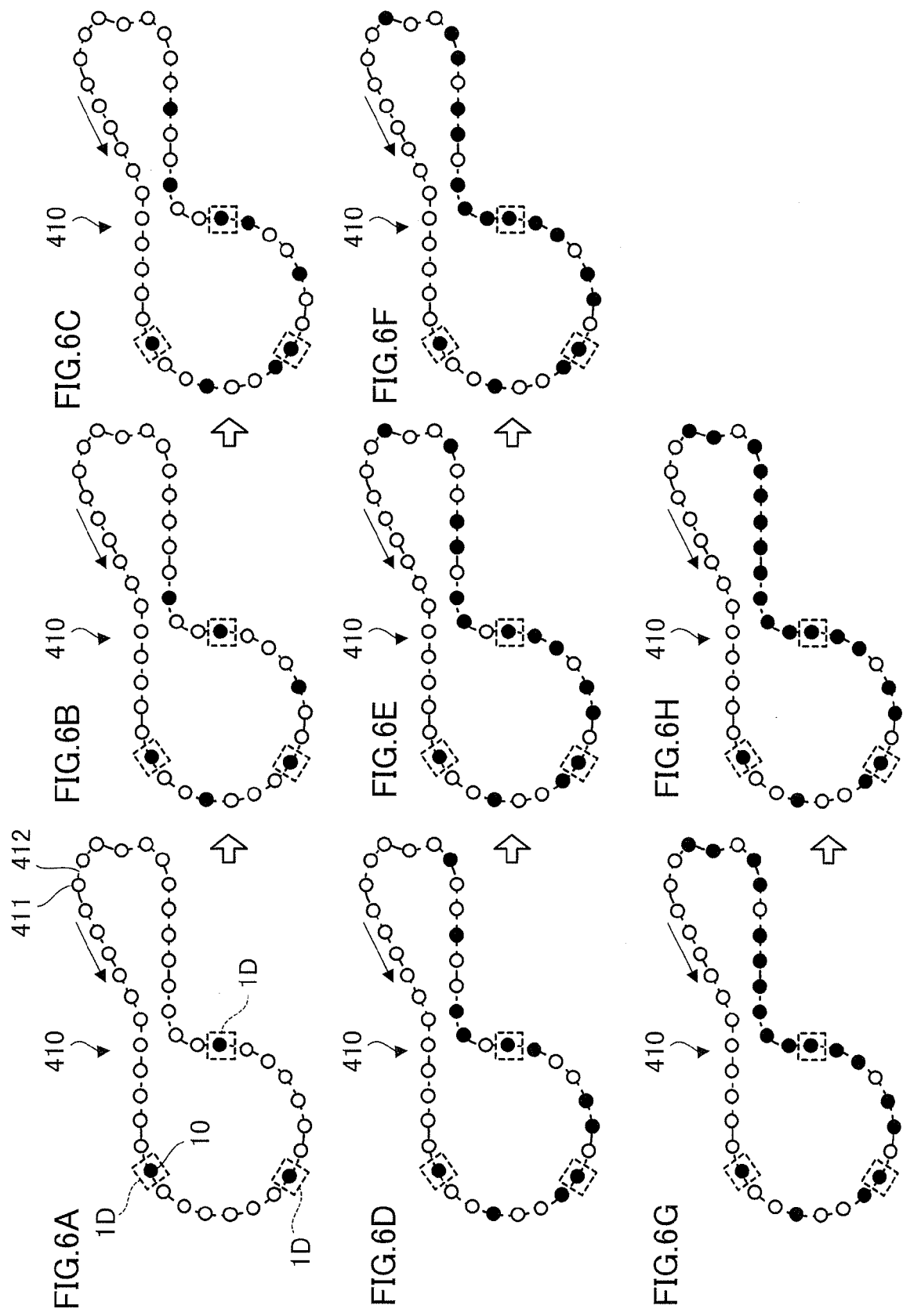
FIGS. 6A to 6H are diagrams showing a conveying state of can bodies in a first conveying mechanism.

Then, in the exemplary embodiment, as a result of configuring like this, as shown in FIGS. 6A to 6H (diagrams showing a conveying state of the can bodies 10 in the first conveying mechanism 411), the can bodies 10 successively discharged from each of the image forming apparatuses 200 are appropriately held by the holding pads 411 and are successively conveyed to a downstream side. To further describe, by providing the configuration like this, the holding pad 411 that holds the can body 10 discharged from the image forming apparatus 200 successively moves while holding the can body 10, and is able to convey the holding can body 10 to the protecting layer forming device 440 without generating an overlap with the holding pad 411 in charge of holding the can body 10 discharged from the next image forming apparatus 200 positioned on a downstream side. Consequently, a vacant holding pad 411 holding no can body 10 becomes the holding pad 411 in charge of holding the can body 10 discharged from the next image forming apparatus 200 positioned on a downstream side. To additionally describe, when a can body 10 discharged from the image forming apparatus 200 is held by the holding pad 411, this holding pad 411 is not occupied by another can body 10 and in a vacant state. It should be noted that, in FIGS. 6A to 6H, the can body 10 is represented by a black circle. Moreover, in FIGS. 6A to 6H, an initial state is shown in FIG. 6A, and a state after 21-pitch forwarding is performed is shown in FIG. 6H.

Next, the protecting layer forming device 440 will be described.

As shown in FIG. 1, part of the protecting layer forming device 440 is provided below the first conveying mechanism 410, and the protecting layer forming device 440 first supports the can body 10 conveyed by the first conveying mechanism 410 from beneath. Next, the protecting layer forming device 440 lays the supporting can body 10 and brings a roll-like member in contact with the outer circumferential surface of the can body 10, to thereby coat the outer circumferential surface with a paint that will play a role as a protecting layer. Thereafter, the protecting layer forming device 440 conveys the can body 10 to the second conveying mechanism 420.

With reference to FIG. 4, the protecting layer forming device 440 will be specifically described.

The protecting layer forming device 440 of the exemplary embodiment is provided with, similar to the image forming apparatus 200, a rotating member 441 that is driven by a not-shown motor and is rotated in the counterclockwise direction (the rotating direction indicated by an arrow positioned below the reference sign 440 in FIG. 1), and a support base 442 that supports the rotating member 441. Further, the protecting layer forming device 440 includes plural holding mechanisms 443 that are provided to protrude from an outer circumferential surface of the rotating member 441 and hold the can bodies 10 conveyed by the first conveying mechanism 410.

Further, there is provided a coating device 444 that coats the outer circumferential surface of the can body 10 held by the holding mechanisms 443 with a paint. Here, the coating device 444 is configured with a container 444A that contains the paint, a coating roll 444B that contacts the outer circumferential surface of the can body 10 from beneath and coats the outer circumferential surface with the paint and a supply roll 444C that supplies the paint from the container 444A to the coating roll 444B.

Here, each of the holding mechanisms 443 has a configuration similar to the holding mechanism 230 provided in the image forming apparatus 200. To describe specifically, as shown in FIG. 4, each of the holding mechanisms 443 includes a securing member 443A that is provided to protrude from the outer circumferential surface of the rotating member 441, arranged substantially horizontally, and secured to the rotating member 441. The holding mechanism 443 further includes a cylindrical support cylinder (mandrel) 443B that is formed cylindrically and is inserted into the can body 10 to support the can body 10. Here, in the exemplary embodiment, similar to the support cylinder (mandrel) 232, the support cylinder 443B is configured with a base portion 443B-1 and a rotating portion 443B-2. Moreover, each of the holding mechanisms 443 includes a disk-shaped member 443C attached to one end portion of the support cylinder 443B and a shaft 443D provided to pierce both of the disk-shaped member 443C and the securing member 443A for securing the disk-shaped member 443C and the securing member 443A.

Moreover, there is provided a rotating mechanism (not shown) that rotates the disk-shaped member 443C around the shaft 443D. Here, similar to the rotating mechanism provided in the image forming apparatus 200, this rotating mechanism is able to be configured by arranging a worm wheel (not shown) inside the disk-shaped member 443C and arranging a worm (not shown) inside the securing member 443A. In this case, it is possible to rotate the disk-shaped member 443C by rotating the worm inside the securing member 443A by a motor (not shown). Moreover, in the exemplary embodiment, in each of the holding mechanisms 443, there is provided a motor (not shown), which is contained inside the base portion 443B-1 and a rotational shaft of which is connected to the rotating portion 443B-2 (the can body 10), to thereby function as a rotating unit that rotates the rotating portion 443-2 (the can body 10) in a circumferential direction.

Here, in forming the protecting layer by the protecting layer forming device 440, first, at a position indicated by the reference sign 4E in FIG. 4, the can body 10 conveyed by the first conveying mechanism 410 is passed to the protecting layer forming device 440. More specifically, at the position indicated by the reference sign 4E, the holding pad 411 breaks (switches from a negative pressure to a positive pressure) suction of the can body 10, which has been conveyed by suction so far, to terminate suction of the can body 10, and thereby, the can body 10 drops downward and is sucked by the support cylinder 443B that is on standby below. Consequently, the support cylinder 443B enters into the inside of the can body 10, to thereby cause a state where the can body 10 is held by the support cylinder 443B. Moreover, by providing a function (not shown) to move the holding pads 411 vertically, the holding pad 411 moves downward, while holding the can body 10, to the support cylinder 443B, and the holding pad 411 breaks (switches from a negative pressure to a positive pressure) suction, and accordingly, suction of the can body 10 is terminated and the holding pad 411 releases the can body 10. On the other hand, by starting suction through a ventilation hole (not shown) provided in the support cylinder 443C, the can body 10 is moved from the holding pad 411 to the support cylinder 443B, to thereby enable the support cylinder 443B to hold the can body 10.

After that, by driving the motor provided in the rotating mechanism (not shown), the disk-shaped member 443C is rotated around the shaft 443D to bring the can body 10 into a lying state. Then, the can body 10 arrives at the coating roll 444B, and the outer circumferential surface of the can body 10 is coated with the paint by the coating roll 444B. Accordingly, the protecting layer is formed on the outer circumferential surface of the can body 10. Thereafter, in the exemplary embodiment, by driving the motor provided in the rotating mechanism again, the disk-shaped member 443C is rotated around the shaft 443D and the can body 10 stands. After that, the can body 10 is passed onto the second conveying mechanism 420.

It should be noted that, when coating of the paint by the coating roll 444B is performed, the motor accommodated inside the base portion 443B-1 is driven, and accordingly, the rotating portion 443B-2 is rotated in the circumferential direction and the can body 10 is also rotated. Moreover, in the exemplary embodiment, each of the coating roll 444B and the supply roll 444C is rotated by using another motor.

Next, the second conveying mechanism 420 will be described.

The second conveying mechanism 420 has a configuration similar to the first conveying mechanism 410. That is, as shown in FIG. 4, the second conveying mechanism 420 includes, as shown in FIG. 4, plural holding pads 421 that suck and hold the can bodies 10 and an upper support member 422 that is provided above the holding pads 421 to support the holding pads 421 from above. Here, as shown in FIG. 1, the upper support member 422 in the second conveying mechanism 420 is formed in a disk shape and is rotated around a center portion. Then, in the exemplary embodiment, the holding pads 421 are in a state of being attached to a lower surface of the disk-shaped upper support member 422.

Here, the can body 10 on which the protecting layer has been formed by the protecting layer forming device 440 is sucked and held by the above-described holding pad 421 when the can body 10 arrives at a position below the second conveying mechanism 420. To specifically describe, when the can body 10 arrives at the position indicated by the reference sign 4F in FIG. 4, instead of suction that has secured the can body 10 to the support cylinder 443B, supply of air whose pressure is increased to a space inside the support cylinder 443B is carried out, to allow the highly-pressured air to flow into a gap between the support cylinder 443B and the can body 10 through the ventilation hole that pierces the inside and the outer surface of the support cylinder 443B, and accordingly, the pressure in the space is increased, to thereby cause a force for separating from the support cylinder 443B to act on the can body 10, thus the can body 10 moves upward. On the other hand, above the can body 10, the holding pad 421 is positioned. Consequently, the can body 10 having moved upward is sucked and held by the holding pad 421. Moreover, by providing a function (not shown) to move the holding pads 421 vertically, the holding pad 421 moves downward to the support cylinder 443B and starts suction, and on the other hand, the support cylinder 443B breaks (switches from a negative pressure to a positive pressure) suction of the can body 10, to thereby accelerate movement of the can body 10 from the support cylinder 443B to the holding pad 421, and moreover, by causing the holding pad 421 to move upward after the holding pad 421 sucks the can body 10, the can body 10 is detached from the support cylinder 443B and moves to the holding pad 421, to thereby enable the can body 10 to be held by the holding pad 421. It should be noted that the can body 10 held by the holding pad 421 moves along the rotation of the upper support member 422, and reaches the third conveying mechanism 430.

Next, the third conveying mechanism 430 will be described.

As shown in FIG. 4, the third conveying mechanism 430 is configured with a metal chain 431 that carries out a circulating movement along a predetermined route, and plural pins 432 attached to the chain 431 and provided to head upward.

Here, in the exemplary embodiment, when the can body 10 conveyed by the second conveying mechanism 420 arrives at a position above the third conveying mechanism 430, holding of the can body 10 is cancelled by breaking (switching from the negative pressure to the positive pressure) the suction of the can body 10 by the holding pad 421. This makes the can body 10 drop downward and the pin 432 is inserted into the inside of the can body 10. After that, the can body 10 comes to move in association with the movement of the chain 431. Moreover, by providing a function (not shown) to move the holding pads 421 vertically, the holding pad 421 moves downward to the pin 432 to insert the pin into the inside of the can body 10, and the holding pad 421 breaks (switches from a negative pressure to a positive pressure) suction of the can body 10 to cancel holding of the can body 10, and thereafter, by causing the holding pad 421 to move upward, to thereby enable the can body 10 to move to the pin 432. It should be noted that, though illustration will be omitted, on a downstream side of the third conveying mechanism 430, a drying device that heats and dries the paint coated by the protecting layer forming device 440, and accordingly, the third conveying mechanism 430 conveys the can body 10 to the drying device.

Here, as in the exemplary embodiment, in the case where an image is formed on a can body 10 based on digital image information, it becomes possible to take flexible measures such as small-lot, high-variety production, as compared to offset printing that is widely used at present. Here, in the exemplary embodiment, since a plate called a lithographic plate, which is used in the offset printing, is not used, a lithographic plate production process, a registration operation between the lithographic plate and a printing machine, a cleaning operation of the lithographic plate, and the like become unnecessary. Consequently, in the exemplary embodiment, an operation called "setups" in changing lots is simplified, and it becomes possible to make flexible responses to small-lot, high-variety production or the like. Moreover, in the defects that occur in the production process of the can body 10, factors related to printing are quite a lot. In the case of performing digital printing as in the exemplary embodiment, there is a possibility of solving part of factors for occurrence of defects.

Next, another image forming system 100 will be described.

Figure 7:
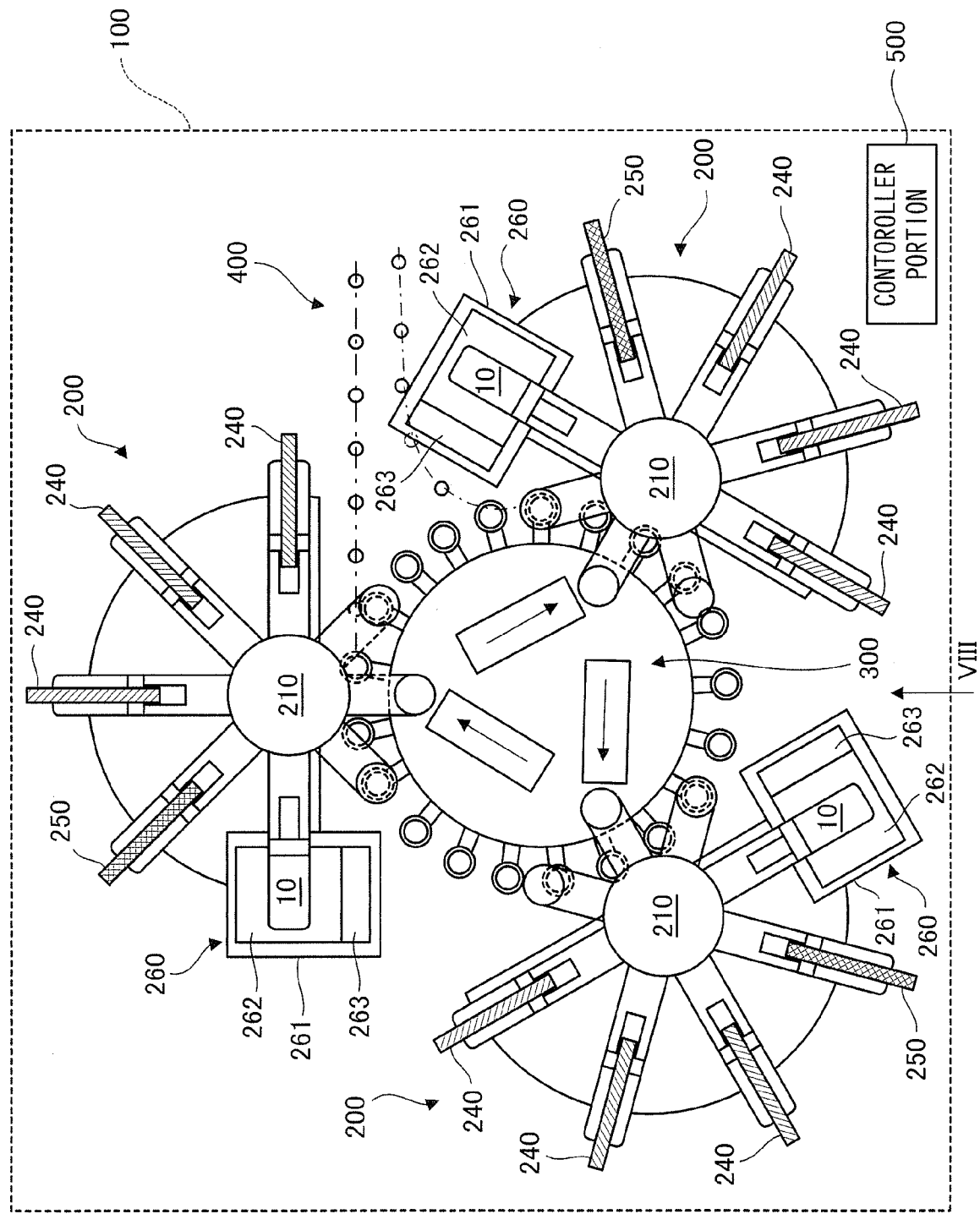
FIG. 7 is a diagram showing another configuration example of the image forming system.
Figure 8:
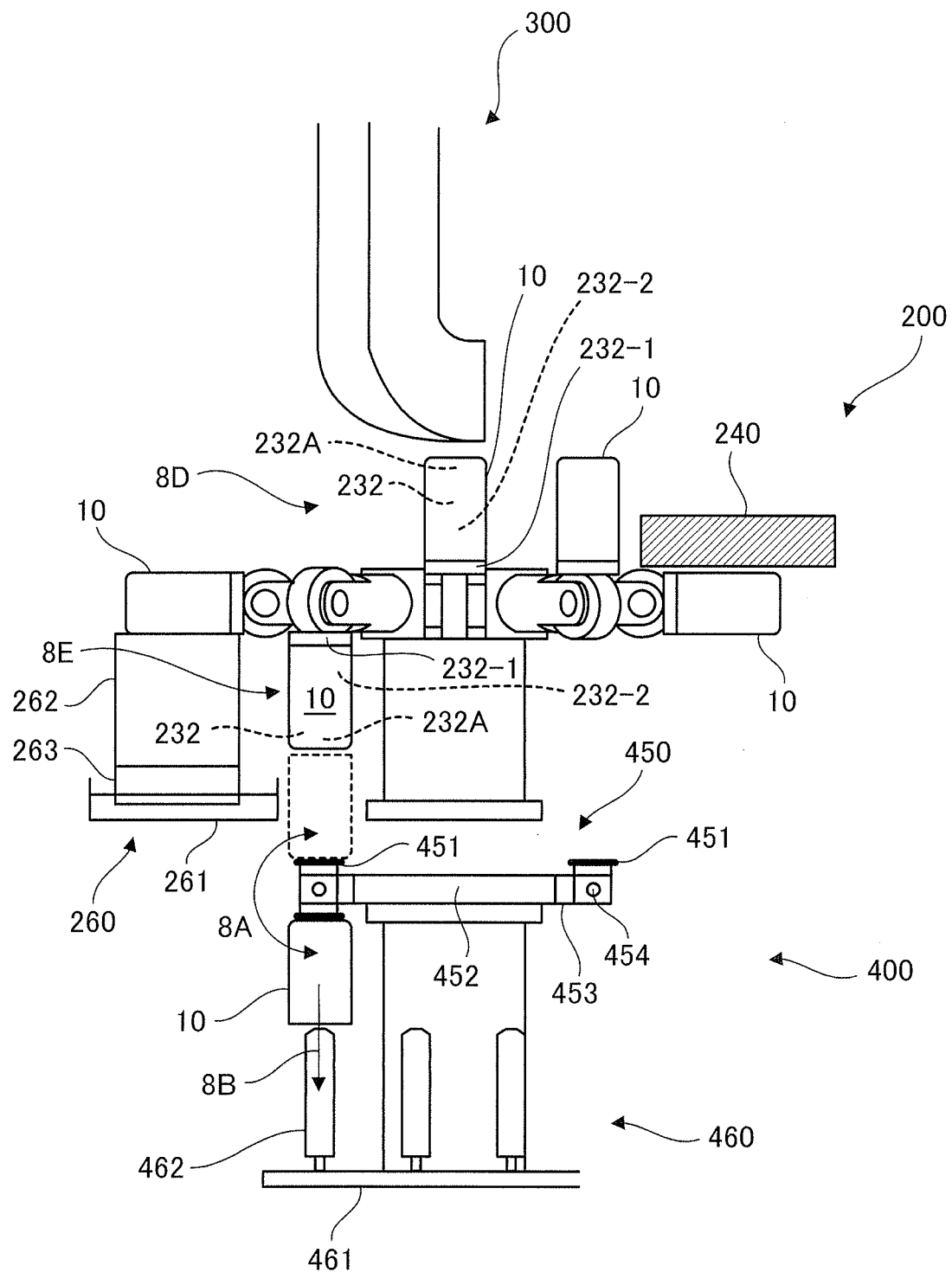
FIG. 8 is a diagram showing the another configuration example of the image forming system.

FIGS. 7 and 8 are diagrams showing another configuration example of the image forming system 100. It should be noted that FIG. 7 is a diagram in a case where the image forming system 100 is viewed from above, and FIG. 8 is a diagram in a case where the image forming system 100 is viewed from the direction of arrow VIII in FIG. 7. It should be noted that, in FIG. 8, one image forming apparatus 200 positioned in an upper portion in FIG. 7, of the plural image forming apparatuses 200 provided in the image forming system 100.

In the configuration example mentioned in the above description, a description has been given of a mode in which the protecting layer forming device 440 that forms the protecting layer on the can body 10 is provided separately from the image forming apparatuses 200; however, in the configuration example shown in FIGS. 7 and 8, a device for forming a protecting layer is integrated into each of the image forming apparatuses 200.

To specifically describe, in the present configuration example, as shown in FIG. 7, three ink jet heads 240 are provided in each of the image forming apparatuses 200. Moreover, in the present configuration example, a UVLED lamp 250 is provided on a downstream side of the three ink jet heads 240 in a rotation direction of a rotating member 210. Moreover, in the present configuration example, on a downstream side of the UVLED lamp 250, a protecting layer forming unit 260 that coats the can body 10 with a paint to form a protecting layer on the can body 10 is provided.

Here, each of the protecting layer forming units 260 has a configuration similar to the protecting layer forming device 440 described above. To describe specifically, as shown in FIGS. 7 and 8, each protecting layer forming unit 260 is configured with a container 261 that contains a paint, a coating roll 262 that contacts the outer circumferential surface of the can body 10 from beneath and coats the outer circumferential surface with the paint and a supply roll 263 that supplies the paint from the container 261 to the coating roll 262.

Moreover, in the exemplary embodiment, a configuration of the can-body discharge mechanism 400 is different from the configuration described above. Here, as shown in FIG. 8, the can-body discharge mechanism 400 in the exemplary embodiment is provided with a first conveying mechanism 450 that is arranged below the image forming apparatus 200, receives the can body 10 from the image forming apparatus 200 and conveys the can body 10. Moreover, the can-body discharge mechanism 400 is provided with a second conveying mechanism 460 that is arranged below the first conveying mechanism 450, receives the can body 10 from the first conveying mechanism 450 and conveys the can body 10.

Here, as shown in FIG. 8, the first conveying mechanism 450 includes plural holding pads 451 that suck and hold the can bodies 10 and a support member 452 that has a disk shape in a case of being viewed from above and supports the holding pads 451. Moreover, in the exemplary embodiment, there are provided support arms 453 that are provided to protrude from an outer circumferential surface of the support member 452 and support the holding pads 451, connecting pins 454, each of which is provided to pierce both of the holding pad 451 and the support arm 453 to connect the holding pad 451 and the support arm 453 in a state where the holding pad 451 is rotatable, and a rotating mechanism (not shown) that includes a motor and rotates the holding pad 451 around the connecting pin 454. Moreover, as a driving source of the rotating mechanism, it is possible to employ air equipment, such as a rotary actuator, in place of the motor.

On the other hand, the second conveying mechanism 460 has a configuration similar to the third conveying mechanism 430 (refer to FIG. 4) described above, and as shown in FIG. 8, the second conveying mechanism 460 is configured with a metal chain 461 that carries out a circulating movement along a predetermined route, and plural pins 462 attached to the chain 461 and provided to head upward.

Here, in the exemplary embodiment, when the image formation by the ink jet heads 240 and irradiation of the can body 10 with ultraviolet light by the UVLED lamp 250 are completed, the can body 10 arrives at the protecting layer forming unit 260. It should be noted that, at this time, the can body 10 is in the lying state as shown in FIG. 8. Thereafter, the coating roll 262 contacts the outer circumferential surface of the can body 10 and the outer circumferential surface of the can body 10 is coated with the paint. It should be noted that, when the coating is performed, similar to the above description, rotation of the can body 10 is carried out, and rotation of the coating roll 262 and the supply roll 263 is also carried out.

After that, in the exemplary embodiment, holding (suction) of the can body 10 by the holding pad 451 is performed, and as indicated by arrow 8A in FIG. 8, rotation of the holding pad 451 around the connecting pin 454 as a rotational center is performed to turn the can body 10 upside down. This brings a state where the opening side (opened side) of the can body 10 faces downward. Subsequently, holding of the can body 10 by the holding pad 451 is canceled. Consequently, as indicated by arrow 8B in FIG. 8, the can body 10 drops toward the pin 462, and holding of the can body 10 by the pin 462 is started. After that, similar to the above description, the can body 10 is conveyed to a drying device that dries the paint on the outer circumferential surface of the can body 10.

Here, in the configuration example shown in FIGS. 7 and 8, the protecting layer forming device 440 shown in FIG. 1 is able to be omitted. Accordingly, the image forming system 100 in the present configuration example has an occupancy are smaller than that of the image forming system 100 shown in FIG. 1. Moreover, in the exemplary embodiment, since the first conveying mechanism 450, which is a mechanism corresponding to the second conveying mechanism 420 shown in FIG. 1, is provided below the image forming apparatus 200, further reduction of the occupancy area is sought. Further, in the present configuration example, the second conveying mechanism 460, which is a mechanism corresponding to the third conveying mechanism 430 shown in FIG. 1, is also provided below the image forming apparatus 200, and thereby further reduction of the occupancy area is sought.

To additionally describe, in the configuration example shown in FIG. 1, since the second conveying mechanism 420 is provided to a position different from the placing position of the image forming apparatus 200, the occupancy area of the image forming system 100 is increased; however, in the configuration example shown in FIGS. 7 and 8, the image forming apparatus 200 partially overlaps the first conveying mechanism 450 as viewed from above, and, as the amount of overlapping, the occupancy area of the image forming system 100 is reduced. Moreover, in a similar manner, in the configuration example shown in FIG. 1, since the third conveying mechanism 430 is provided to a position different from the placing position of the image forming apparatus 200, the occupancy area of the image forming system 100 is increased; however, in the configuration example of the exemplary embodiment, the image forming apparatus 200 partially overlaps the second conveying mechanism 460 as viewed from above, and, as the amount of overlapping, the occupancy area of the image forming system 100 is reduced.

Moreover, in the configuration example shown in FIGS. 7 and 8, when the insertion of the support cylinder 232 into the can body 10 is performed, as indicated by the reference sign 8D in FIG. 8, the support cylinder 232 is arranged so that the one end portion 232A of the support cylinder 232 faces upward, and the can body 10 moves downward from above, and thereby the support cylinder 232 is inserted into the can body 10. Moreover, when detachment of the can body 10 from the support cylinder 232 is performed, as indicated by the reference sign 8E in FIG. 8, the support cylinder 232 is arranged so that the one end portion 232A of the support cylinder 232 faces downward, and the can body 10 moves downward, and thereby the can body 10 is detached from the support cylinder 232.

Accordingly, in the exemplary embodiment, it is possible to arrange the can-body supply mechanism 300 above the support cylinder 232, and also possible to arrange the can-body discharge mechanism 400 below the support cylinder 232. To additionally describe, it becomes possible to arrange the can-body supply mechanism 300 and the can-body discharge mechanism 400 in a state of being displaced from each other in the vertical direction. In this case, interference hardly occurs between the can-body supply mechanism 300 and the can-body discharge mechanism 400, and accordingly, a degree of freedom in arranging the can-body supply mechanism 300 and a degree of freedom in arranging the can-body discharge mechanism 400 are increased.

It should be noted that, in the configuration example shown in FIGS. 7 and 8, a description has been given of a mode in which, when insertion of the support cylinder 232 into the can body 10 is performed, the one end portion 232A of the support cylinder 232 faces upward, and when detachment of the can body 10 from the support cylinder 232 is performed, the one end portion 232A of the support cylinder 232 faces downward; however, it is also possible to cause the one end portion 232A of the support cylinder 232 to face downward when insertion of the support cylinder 232 into the can body 10 is performed, and to cause the one end portion 232A of the support cylinder 232 to face upward when detachment of the can body 10 from the support cylinder 232 is performed.

It should be noted that, in FIG. 1, a description has been given of the case where the four ink jet heads 240 are provided to each of the image forming apparatuses 200, whereas, in FIG. 7, a description has been given of the case where the three ink jet heads 240 are provided to each of the image forming apparatuses 200; however, the number of ink jet heads is not limited. For example, six ink jet heads 240 are able to be provided. Moreover, the color of ink ejected from the ink jet head 240 is not particularly limited. For example, inks of yellow, magenta, cyan and black, inks of specific colors set up in advance, or inks set up for a corporate color of a specific company can be used.

Moreover, each of the image forming apparatuses 200 may be provided movably, and part of the image forming apparatuses 200 may be exchanged with other image forming apparatuses 200. In this case, for example, it becomes possible to move the image forming apparatus 200 including the four ink jet heads 240, and to newly provide the image forming apparatus 200 including six ink jet heads 240.

Figure 9:
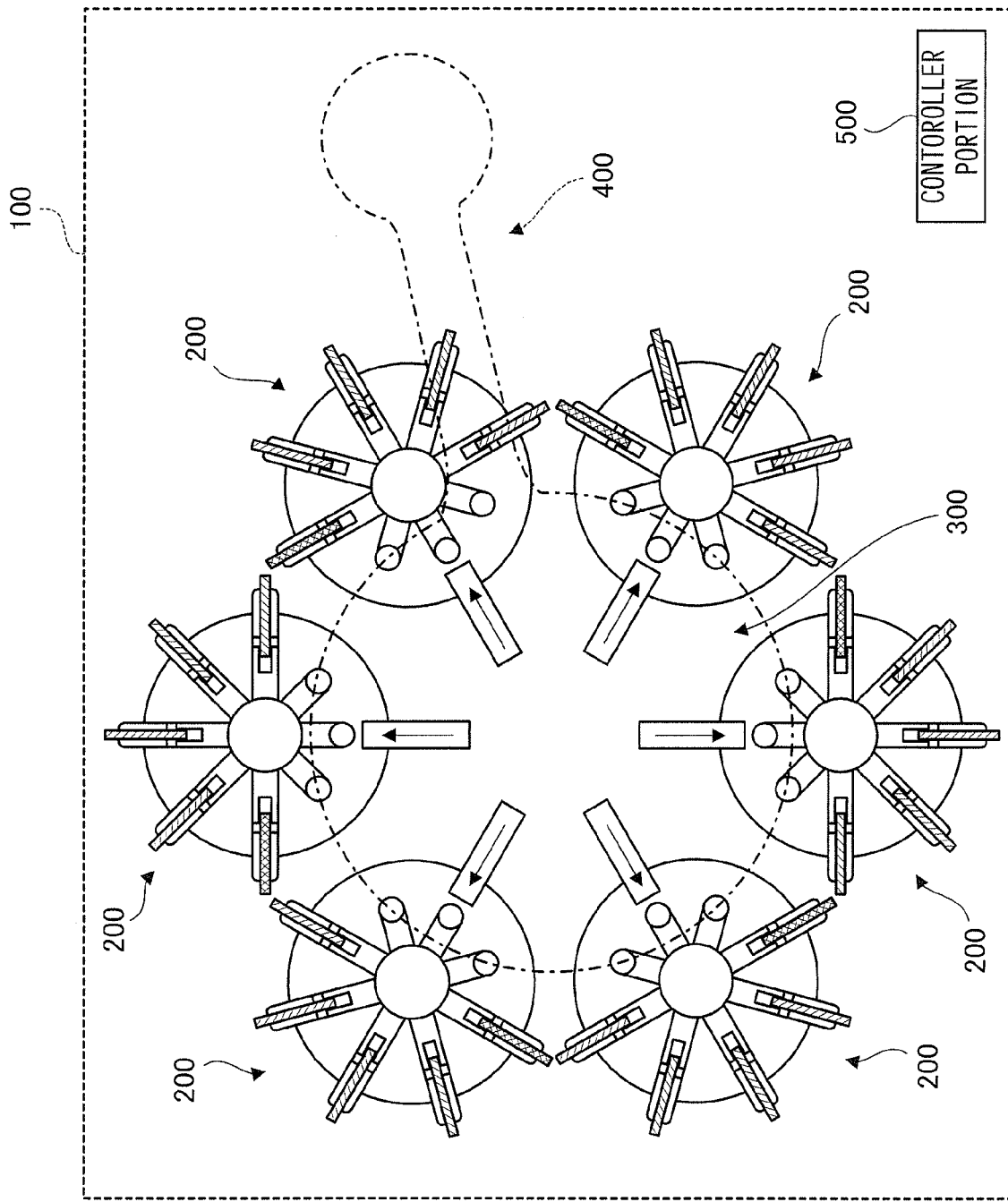
FIG. 9 is a diagram showing still another configuration example of the image forming system.

Moreover, in the exemplary embodiment described above, a description has been given of the configuration example in which the three image forming apparatuses 200 are provided; however, the number of image forming apparatuses 200 is not particularly limited. For example, as shown in FIG. 9 (a diagram showing still another configuration example of the image forming system 100), six image forming apparatuses 200 are able to be arranged. Moreover, not limited to three or six, the number of image forming apparatuses 200 is able to be increased or decreased as necessary. In this manner, by increasing the image forming apparatuses 200, parallel printing at the same time becomes available, and therefore, an ink jet printer with increased processing speed can be provided.

Moreover, in the above description, the case in which ink is directly ejected onto the can body 10 from the ink jet head 240 has been described; however, not limited to a mode like this, it is possible to provide a configuration in which ink is ejected onto an intermediate transfer body to form an image onto the intermediate transfer body, and thereafter the image is transferred to the can body 10. It should be noted that, in this case also, it is desirable that the ink jet head 240 is positioned above the intermediate transfer body and ink is ejected downward from above.

Moreover, in FIGS. 1 and 7, a description has been given of an apparatus in which the outer circumferential surface of the can body 10 is coated with a protecting layer forming paint by use of the roll-like member and curing of the coated film is performed by heat drying; however, instead of coating the protecting layer forming paint by the roll-like member, it is possible to carry out coating of the protecting layer forming paint by the ink jet head 240. Though drawing will be omitted, for example, in the image forming apparatus 200 shown in FIG. 2A, by mounting the ink jet head 240 that ejects the protecting layer forming paint behind the UVLED lamp 250, it is possible to coat the can body 10 passed through the UVLED lamp 250 with the protecting layer forming paint. It should be noted that, in this case, a paint of thermal cure type is adopted as the protecting layer forming paint, the can body 10 is conveyed to the heat drying device, whereas, in the case where the paint of UV cure type is adopted, the can body 10 is conveyed to a UV drying device. Further, in this apparatus, it has been assumed that the outer circumferential surface of the can body 10 is coated with ink by the ink jet heads 240; however, the can body 10 in such a case is sometimes a can body 10, on a base of which mainly a white paint referred to as a base coat is applied in advance, for increasing printing quality. In other words, there are two kinds of the can body 10 to put in, namely, the can body 10 with a base coat and the can body 10 without a base coat. The base coat process in this case has to be performed in advance in a separate line. Accordingly, by mounting the ink jet head 240 for the base coat paint ahead of the first ink jet head 240 of the image forming apparatus 200, and by further mounting the UVLED lamp 250 to cure the base coat paint having been applied, it is possible to perform the base coat processing at the same time of printing onto the can body 10. Moreover, if the ink jet head 240 for ejecting the protecting layer forming paint is mounted, it becomes possible to perform painting for forming the protecting layer at the same time.

Moreover, though description has been omitted above, a configuration in which the can-body receiving position 1C (refer to FIG. 1) and the can-body discharging position 1D are provided outside if the virtual line 1B (refer to FIG. 1) can be considered. By the way, in this case, the can-body supply mechanism 300 and the can-body discharge mechanism 400 come to be positioned outside of the virtual line 1B, and accordingly, the occupancy area of the image forming system 100 is apt to be increased. On the other hand, in the configuration of the exemplary embodiment, the can-body receiving position 1C and the can-body discharging position 1D are provided inside the virtual line 1B, and therefore, it is possible to arrange the can-body supply mechanism 300 and the can-body discharge mechanism 400 inside the virtual line 1B. Then, in this case, it becomes possible to reduce the occupancy area of the image forming system 100.

Figure 10:
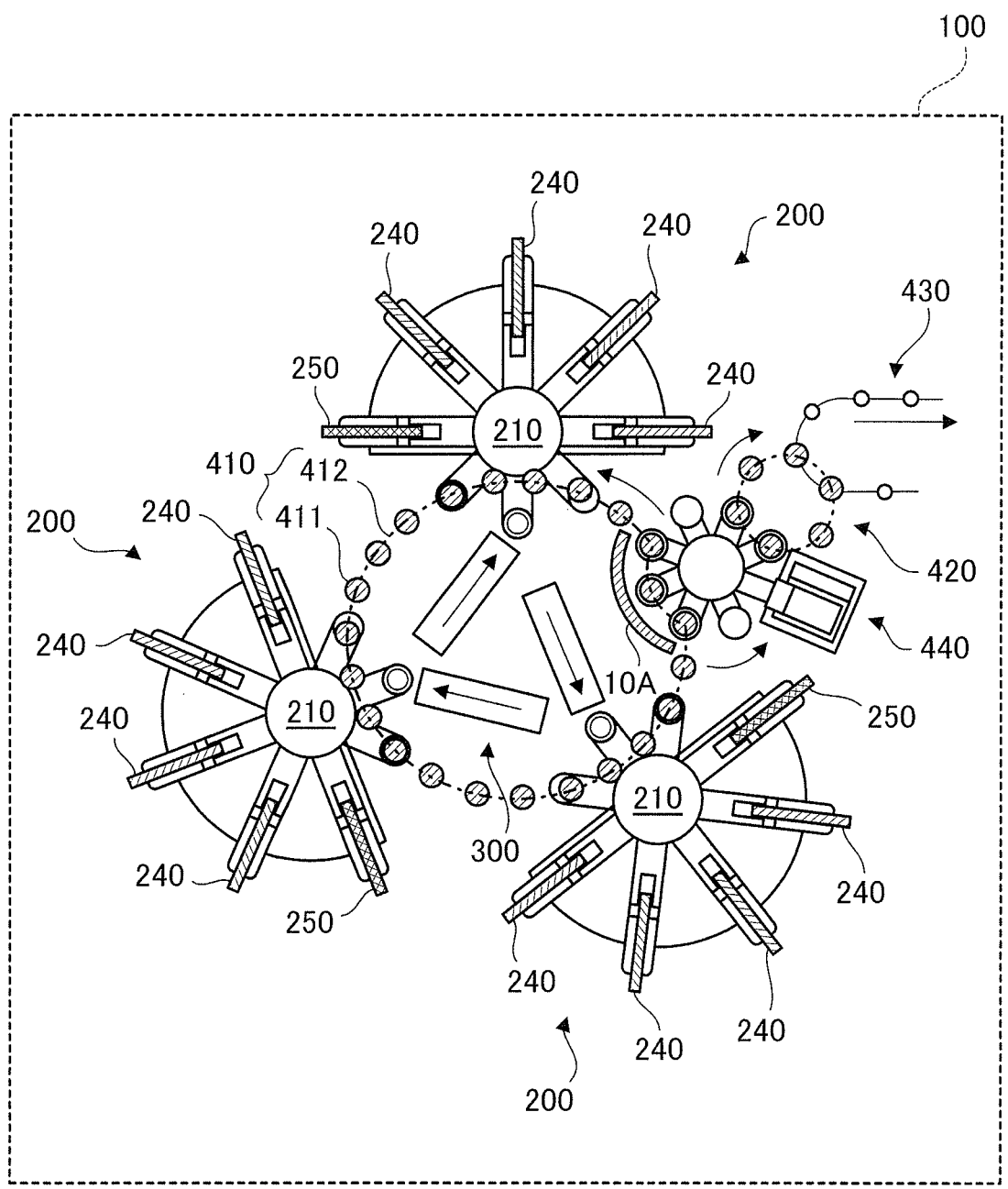
FIG. 10 is a diagram showing still another configuration example of the image forming system.

Moreover, in the above description, as an example, as shown in FIG. 1, a description has been given of the case where the holding pads 411 that constitute the first conveying mechanism 410 make a circulating movement along the route formed not circularly; however, as shown in FIG. 10 (a diagram showing still another configuration example of the image forming system 100), the holding pads 411 may be allowed to move along a route formed in substantially a circular shape (substantially an annular shape). To the holding pad 411, as an example of a suction member, a tube for providing a negative pressure to the inside of the holding pad 411 comes to be connected; however, in the case where the holding pads 411 are moved along the route formed to be not circularly as shown in FIG. 1, tube arrangement is apt to be complicated. On the other hand, as shown in FIG. 10, in the case where the holding pads 411 are moved along the route formed substantially circular, tube arrangement is able to be simplified.

It should be noted that, in the image forming apparatus 200 shown in FIG. 10, the image is formed on the can body 10 by use of the ink of the ultraviolet cure type and the ink is cured by use of the UVLED lamp 250. On the other hand, an ink to be cured by heat drying can be used, of course, and in this case, the can body 10 is heated by the heater indicated by the reference sign 10A in FIG. 10 and the ink on the surface of the can body 10 is cured. To additionally describe, in the configuration example shown in FIG. 10, the can body 10 is heated when the can body 10 is passed onto the protecting layer forming device 440, and the ink on the surface of the can body 10 is cured.

Moreover, though description has been omitted above, the respective image forming apparatuses 200 in each of the exemplary embodiments described above are able to form images different from one another on the can body 10, and in this case, the can bodies 10 successively conveyed (discharged) by the can-body discharge mechanism 400 include the can bodies 10 of various designs. In such a case, for example, it is preferable to provide a sorting device that sorts the can bodies 10 conveyed by the can-body discharge mechanism 400 according to the images (designs) formed on the can bodies 10. In a case of providing a device like this, shipment in a state where the can bodies 10 having different designs exist in a mixed manner is prevented, and accordingly, flexible production, such as small-lot, high-variety production, is able to be carried out with ease.

It should be noted that the sorting device is able to be configured with, for example, a reading unit that is configured with a CCD camera or the like and reads an image (a design) formed on the can body 10, and a switching mechanism that is provided on a conveying route of the can body 10 and switches the conveying route of the can body 10 based on the reading result by the reading unit. It should be noted that the target of reading by the reading unit may be the image (design) itself formed on the can body 10, or may be a code image (for example, a bar code) formed corresponding to the image (design). To additionally describe, there may be a mode in which the code image formed on the can body 10 is read by the reading unit and the conveying route is switched based on the result of reading the code image.

In the conventional lithographic plate printing, since it is necessary to make changeovers, such as stopping a printing machine, cleaning lithographic plates or inks that have been used, and replacing with new lithographic plates or inks, man-hours for the changeovers become burdensome to producers; and therefore, the small-lot, high-variety production has been avoided. However, by adopting this, such changeovers become unnecessary, and further it becomes unnecessary to stop the printing machine, and thereby factors in increasing costs become nonexistent and the small-lot, high-variety production of the can bodies 10, which is not burdensome to the producers, become available. Moreover, by configuring the switching mechanism for switching the conveying route, the sorting operation per lot is simplified. Moreover, by forming the code image on the can body 10, it becomes possible to perform lot administration of the can bodies 10, and accordingly, product traceability after shipment of the can bodies 10 can be automatically administered. The product traceability is considered to be an important factor that is needed for administering distribution history. It can be said that there is a large effect in automatically administrating traceability of high-volume products like the can bodies 10.

Moreover, the image forming system 100 is able to be configured as follows.

Figure 11:
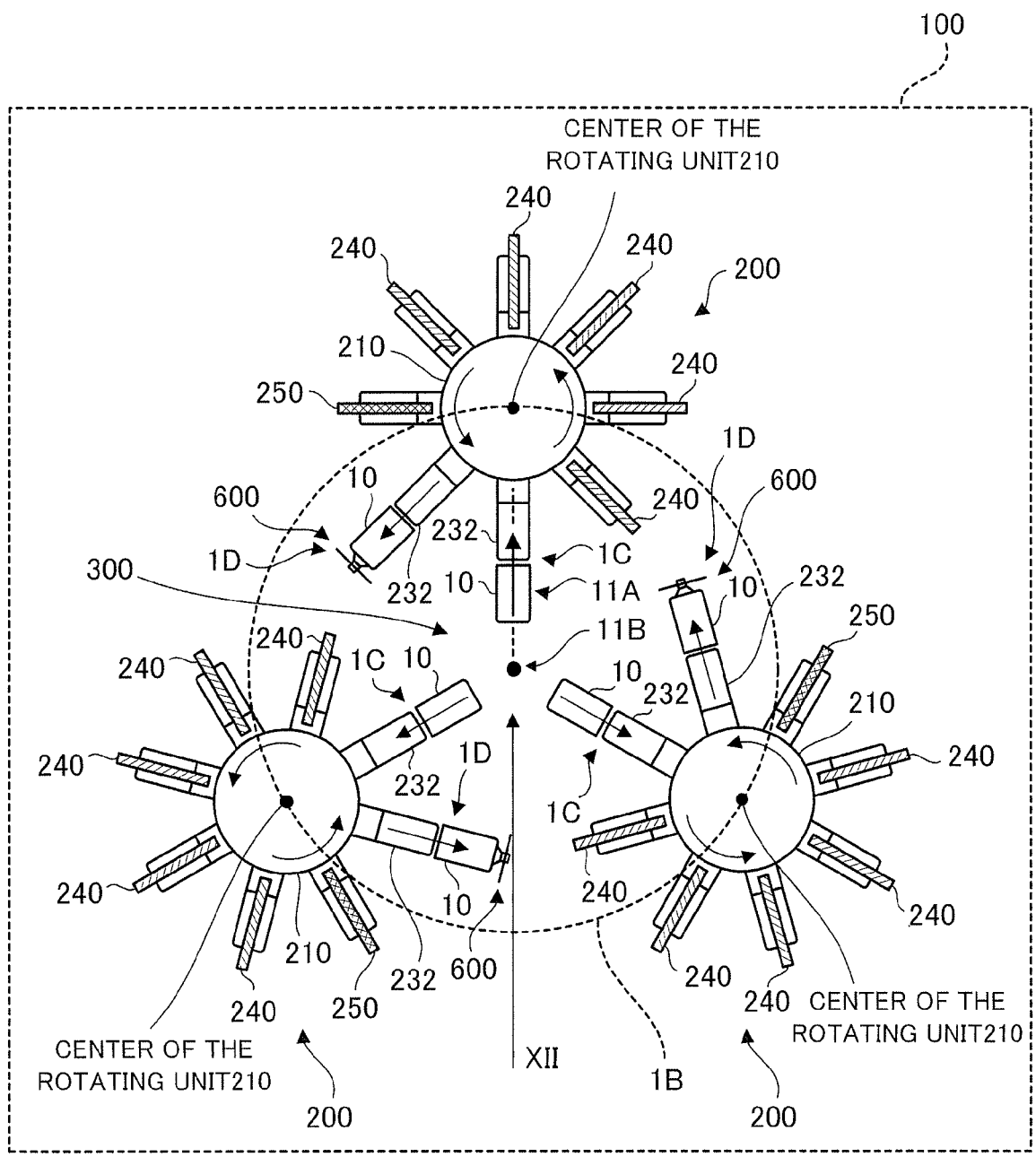
FIG. 11 is a top view of still another configuration example of the image forming system.

FIG. 11 is a top view of still another configuration example of the image forming system 100.

Similar to the configuration described above, also in the configuration example shown in the figure, the can-body receiving position 1C and the can-body discharging position 1D are provided inside the virtual line (virtual circle) 1B. Consequently, it is possible to arrange the can-body supply mechanism 300 and the can-body discharge mechanism 400 (described later) inside the virtual line 1B, and similar to the above description, it becomes possible to reduce the occupancy area of the image forming system 100.

On the other hand, in the configuration example of the exemplary embodiment, rotation of the support cylinder 232 that supports the can body 10 (upward rotation (standing), downward rotation) is not performed, and the can body 10 is attached to the support cylinder 232 in the lying state, and the can body 10 is detached from the support cylinder 232 in the lying state. To additionally describe, in the configuration example, the support cylinder 232 is not displaced and is kept to have constant attitude. In the case where rotation (upward rotation, downward rotation) of the support cylinder 232 is performed, positions of the can bodies 10 when the image formation is performed are possibly different between the respective can bodies 10. In such a case, there is a possibility of deteriorating quality of the image formed on the outer circumferential surface of the can body 10.

Accordingly, in the exemplary embodiment, the configuration in which rotation of the support cylinder 232 is not rotated, but the support cylinder 232 makes a revolution in the state of lying is provided. To additionally describe, in the exemplary embodiment, from the time to start supporting of the can body 10 by the support cylinder 232 to the time of detachment of the can body 10 from the support cylinder 232, by way of orbital movement (revolution) of the support cylinder 232, the attitude of the support cylinder 232 is kept constant, to thereby make it harder for image quality to be deteriorated resulting from positional variation of the support cylinder 232.

Here, in the configuration example, in this manner, since attachment of the can body 10 is performed to the support cylinder 232 in the lying state, and the can body 10 is detached from the support cylinder 232 in the lying state, the configurations of the can-body supply mechanism 300 and the can-body discharge mechanism 400 are different from the configurations described above.

To specifically describe, in the configuration example, first, the can body 10 is supplied onto an extension of an axial line of the support cylinder 232 by the can-body supply mechanism 300 as indicated by arrow 11A in FIG. 11, and thereafter, the can body 10 is moved along the axial line toward the support cylinder 232. Here, movement of the can body 10 toward the support cylinder 232 is performed by blowing air to a bottom portion of the can body 10, and sucking the can body 10 by the support cylinder 232. It should be noted that, instead of blowing the air to the bottom portion of the can body 10, the can body 10 may be pushed out toward the support cylinder 232 by a not shown pushing member.

Figure 12:
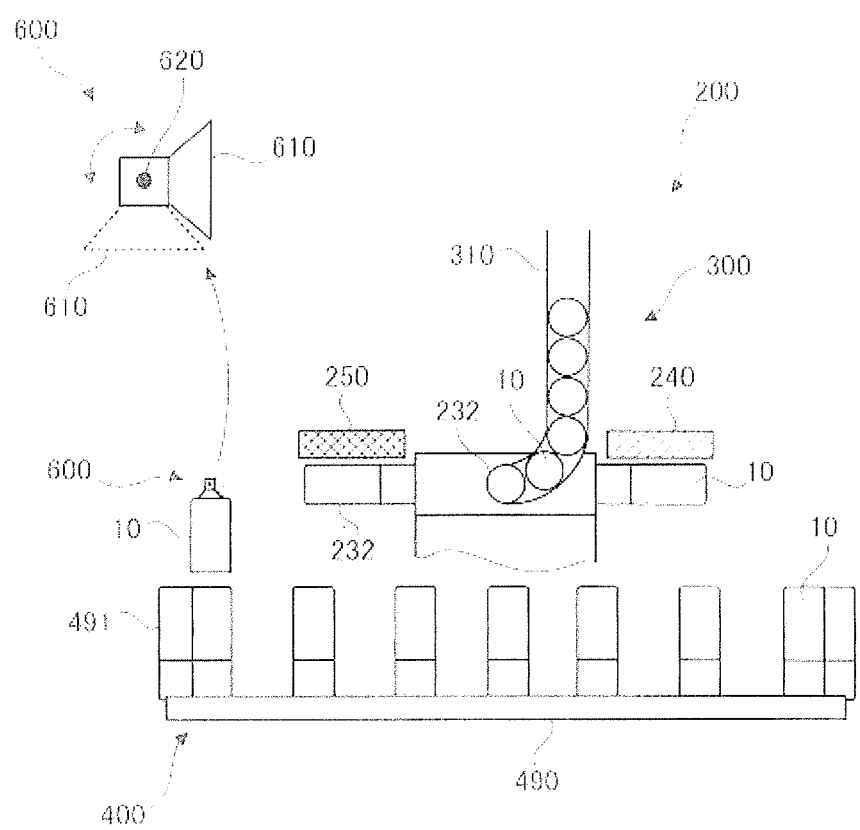
FIG. 12 is a diagram in a case where a single image forming apparatus is viewed from a direction of arrow XII in FIG. 11.

With reference to FIG. 12 (a diagram in a case where one image forming apparatus 200 is viewed from the direction of arrow XII in FIG. 11) also, to describe the can-body supply mechanism 300, the can-body supply mechanism 300 is provided with a duct 310 arranged to head downward from above, similar to the above description. Then, in the configuration example, by guiding the can body 10 by the duct 310, the can body 10 is arranged onto the extension of the axial line of the support cylinder 232.

It should be noted that, in the configuration example, since the can body 10 is supplied to the support cylinder 232 in the lying state, different from the configuration described with reference to FIG. 5, the can body 10 supplied from the upstream side in the lying state is supplied to the support cylinder 232 just as it is. It should be noted that, in the configuration example, a description has been given of the case where the can body 10 in the lying state is supplied from the upstream side as an example; however, it is possible to supply the can body 10 in the standing state from the upstream side. Here, in the case where the can body 10 in the standing state is supplied, as shown in FIG. 5, the can body 10 is laid down by the twisted duct 310, and the can body 10 after being laid down is supplied to the support cylinder 232. It should be noted that, other than the duct 310, for example, by use of a changing mechanism to be described later, it is also possible to lay down the can body 10 in the standing state.

Next, the can-body discharge mechanism 400 will be described.

In the configuration example, as shown in FIG. 12, the can-body discharge mechanism 400 is provided below the support cylinder 232. Here, the can-body discharge mechanism 400 is provided with a moving member 490 that makes a circulating movement along a predetermined route. Moreover, there are provided plural support cylinders 491 that are attached to an upper portion of the moving member 490 and are inserted into the inside of the can bodies 10 to support the can bodies 10. Here, the support cylinder 491 is formed cylindrically, and in supporting the can body 10 supplied from above, the support cylinder 491 enters into the inside of the can body 10 and carries out suction of the can body 10.

Moreover, in the can-body discharge mechanism 400 in this configuration example, as shown in FIG. 12, the changing mechanism 600 that changes orientation of the can body 10 is provided. Here, the changing mechanism 600 is provided with a holding pad 610 that sucks the bottom portion of the can body 10 having been supported by the support cylinder 232 and holds the can body 10, a shaft 620 that supports the holding pad 610 in a rotatable state, and a rotating mechanism (not shown) that makes 90° rotation of the shaft 620 by a motor. It should be noted that the changing mechanism 600 is arranged inside the virtual line 1B as shown in FIG. 11, and accordingly, increase of the occupancy area of the image forming system 100 is prevented.

Here, when the orientation of the can body 10 is changed by the changing mechanism 600, first, air is supplied to the inside of the support cylinder 232, and thereby the can body 10 is moved toward the holding pad 610. On the other hand, the holding pad 610 supports the bottom portion of the can body 10 having been moved by suction. Subsequently, the motor provided in the rotating mechanism is driven, and thereby the holding pad 610 is rotated 90° in the clockwise direction in the figure. This causes the can body 10 in the lying state to stand, and an opening of the can body 10 faces downward.

After that, cancellation of suction of the holding pad 610 causes the can body 10 to drop downward, and the support cylinder 491 enters into the inside of the can body 10. Further, suction of the can body 10 by the support cylinder 491 is performed. Thereafter, the support cylinder 491 is moved to the downstream side, and along with this, the can body 10 is also moved to the downstream side. It should be noted that, in passing of the can body 10 from the holding pad 610 to the support cylinder 491, it is possible to bring the holding pad 610 close to the support cylinder 491, or to bring the support cylinder 491 close to the holding pad 610.

Figure 13:
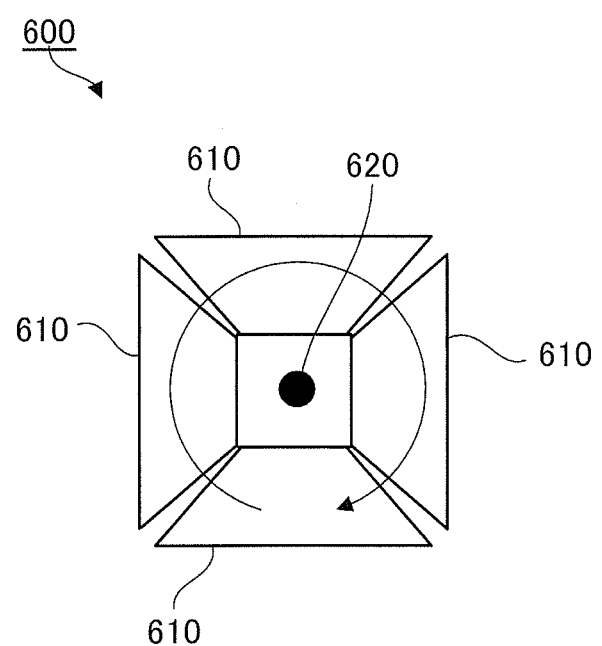
FIG. 13 is a diagram showing another configuration example of a changing mechanism.

Here, as shown in FIG. 13 (a diagram showing another configuration example of the changing mechanism 600), plural (in the configuration example, four) holding pads 610, not only a single holding pad 610, may be attached to the shaft 620.

In the case of a single holding pad 610, for example, it is necessary to carry out the +90° rotation of the shaft 620 and the −90° rotation of the shaft 620 repeatedly; however, in the case of providing plural holding pads 610 as shown in FIG. 13, it is sufficient to perform the rotation of the shaft 620 in one direction, and accordingly, it becomes possible to increase the number of the can bodies 10 capable of being conveyed per unit time.

Moreover, in the case where the plural holding pads 610 are provided as shown in FIG. 13, it becomes possible to perform receipt of the can body 10 from the support cylinder 232 (refer to FIG. 12) and passing of the can body 10 to the support cylinder 491 at the same time, and in this case, also, it becomes possible to increase the number of the can bodies 10 capable of being conveyed per unit time.

Figure 14:
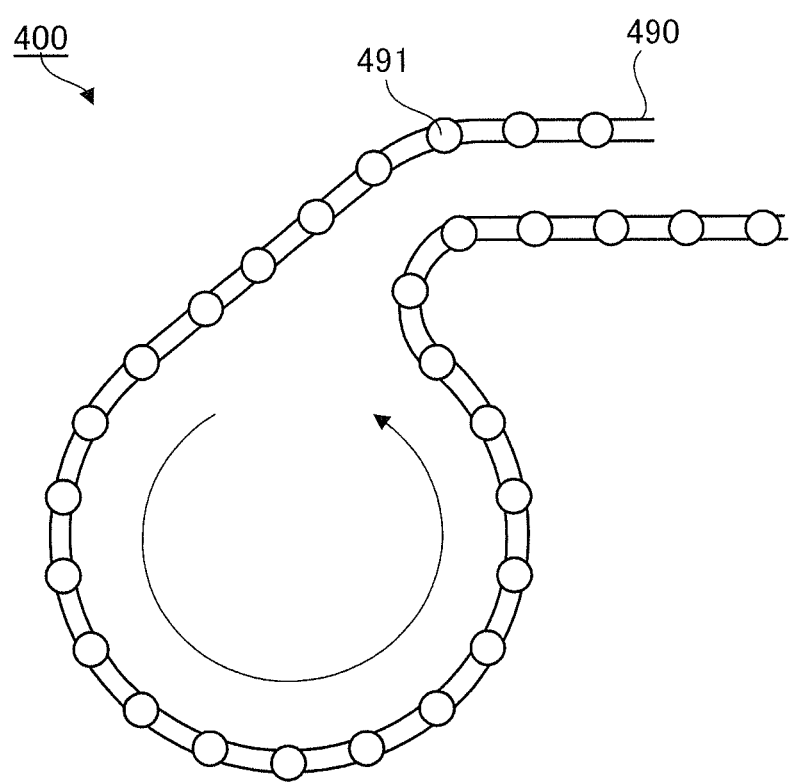
FIG. 14 is a top view of a can-body discharge mechanism.

It should be noted that, as shown in FIG. 14 (a top view of the can-body discharge mechanism 400), and moreover, similar to the first conveying mechanism 410 shown in FIG. 1, the moving member 490 that supports the support cylinders 491 is provided to make a circulating movement along a predetermined route. Moreover, similar to the above description, the moving member 490 is provided through the can-body discharging position 1D (refer to FIG. 11) provided in each of the three image forming apparatuses 200.

Further, the moving member 490 is provided to pass below the three image forming apparatuses 200. In this configuration example, this prevents increase of the occupancy area of the image forming system 100. Moreover, the moving member 490 is provided to pass through inside the above-described circular virtual line 1B (refer to FIG. 11). To additionally describe, the moving member 490 is provided to pass through a side closer to the position indicated by the reference sign 11B in FIG. 11 (the center of arrangement of the three image forming apparatuses 200) than the center portion of each of the image forming apparatuses 200 (the center portion of the rotating member 210 (refer to FIG. 11)).

Moreover, also in the configuration example, similar to the above description (as described by using FIGS. 6A to 6H), the can bodies 10 successively discharged from each of the image forming apparatuses 200 are supported by the support cylinders 491, and successively conveyed to the downstream side; however, when the discharged can body 10 is to be supported by the support cylinder 491, the support cylinder 491 is in a vacant state.

To describe specifically, the support cylinders 491 that support the can bodies 10 discharged from the image forming apparatus 200 are successively moved while holding the can bodies 10, whereas, the support cylinders 491 in charge of holding the can bodies 10 to be discharged from the next image forming apparatus 200 positioned on the downstream side are in the vacant state, and when the vacant support cylinder 491 arrives at the next image forming apparatus 200 positioned on the downstream side, the can body 10 is supplied to the vacant support cylinder 491. Consequently, also in this configuration example, the can bodies 10 successively discharged from each of the image forming apparatuses 200 are conveyed to the downstream side without delay.

By the way, image formation onto the outer circumferential surface of the can body 10 is performed by multicolor printing in many cases; however, from each of the ink jet heads 240 provided in each of the image forming apparatuses 200, ink of a single color is ejected. Accordingly, image formation onto the can body 10 is performed by overprinting by use of the plural ink jet heads 240. To describe further, the can body 10 put into the image forming apparatus 200 first arrives at the first ink jet head 240, and image formation onto the outer circumferential surface of the can body 10 is performed by the first ink jet head 240.

After that, the rotating member 210 rotates 45° in the counterclockwise direction, and the can body 10 arrives at the second ink jet head 240. Then, by the second ink jet head 240, ink of the second color is ejected onto the outer circumferential surface of the can body 10. Thereafter, in the similar manner, the can body 10 arrives at the third ink jet head 240 and the fourth ink jet head 240, and further image formation on the can body 10 is performed by these ink jet heads 240.

Hereinafter, a detailed description will be given of an image forming process by the ink jet heads 240.

Figure 15A:
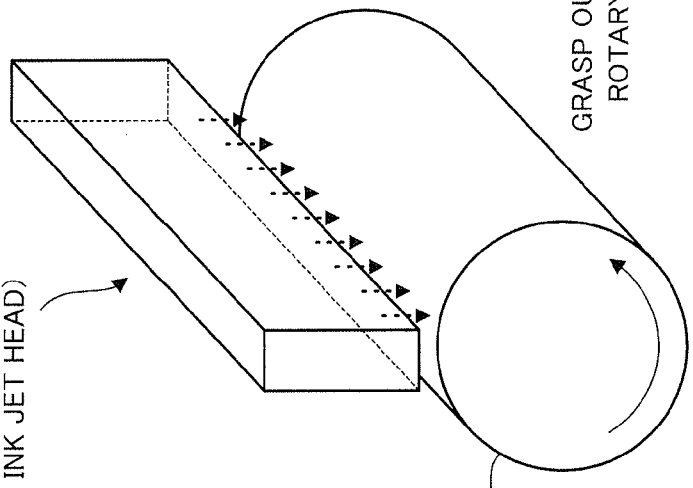
FIGS. 15A and 15B are diagrams showing an image forming process by ink jet heads.
Figure 15B:
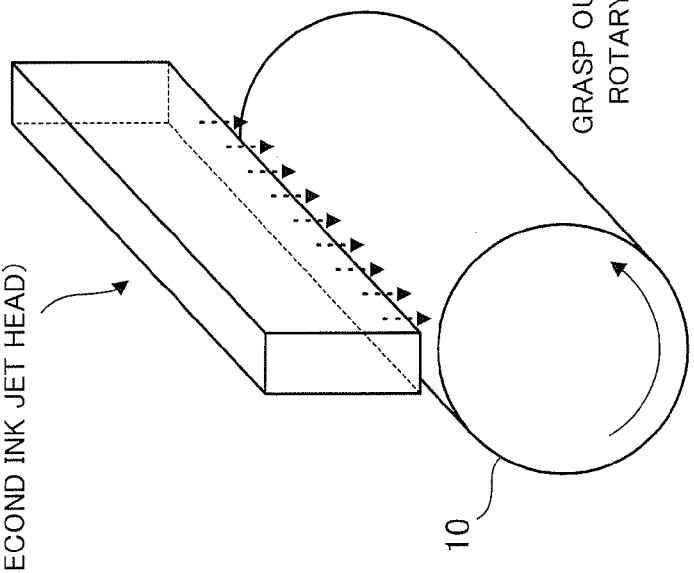

FIGS. 15A and 15B are diagrams showing the image forming process by the ink jet heads 240. It should be noted that FIG. 15A is a diagram showing the ink jet head 240 and the can body 10 when image formation by the first ink jet head 240 is performed, and FIG. 15B is a diagram showing the ink jet head 240 and the can body 10 when image formation by the second ink jet head 240 is performed.

Here, in the exemplary embodiment, as described above, movement of the can body 10 (revolution of the can body 10 and rotation of the rotating member 210) is stopped at a position where the first ink jet head 240 and the can body 10 face each other. Then, as shown in FIG. 15A, ink is ejected from the first ink jet head 240 onto the can body 10 that performs rotation. Accordingly, an image by the ink of the first color is formed on the outer circumferential surface of the can body 10.

Here, in the exemplary embodiment, when the first ink jet head 240 starts to eject the ink, an output from the rotary encoder is grasped by the controller portion 500 (refer to FIG. 1), and a rotation angle of the can body 10 (a rotation angle of a rotational shaft of the servomotor) when the ink is ejected by the first ink jet head 240 is grasped by the controller portion 500. It should be noted that, in this specification, hereinafter, the grasped rotation angle is referred to as "reference angle". To additionally describe, in the exemplary embodiment, when ejection of ink by the first ink jet head 240 is started, the output from the rotary encoder is grasped, and information related to the rotation angle when the first ink jet head 240 starts printing on the can body 10 is obtained by the controller portion 500 that functions as a first obtaining unit. At this time, the first ink jet head 240 reads image data from an original point of image data stored in a page memory 700 (a position where the angle difference $\Delta\theta$ becomes 0° in FIG. 16), and by supplying the read image data to the first ink jet head 240, the ink is ejected onto the can body 10, and thereby the image by the ink of the first color is formed on the outer circumferential surface of the can body 10. At this time, a rotation angle of the can body 10 corresponding to an original point of the image (an original point of the image data) by the ink of the first color formed onto the can body 10 is obtained by the controller portion 500. This obtained angle becomes the reference angle.

It should be noted that, though the description has been omitted above, four page memories 700 are provided to correspond to respective of the first ink jet head 240 to the fourth ink jet head 240, and in a first page memory 700, image data of the image to be formed by the first ink jet head 240 is stored. When the image is formed by the first ink jet head 240, the image data is supplied to the first ink jet head 240 from the first page memory 700. It should be noted that, in a second page memory 700, image data of the image to be formed by the second ink jet head 240 is stored, in a third page memory 700, image data of the image to be formed by the third ink jet head 240 is stored, and in a fourth page memory 700, image data of the image to be formed by the fourth ink jet head 240 is stored.

To further describe each of the page memories 700 corresponding to each of the first ink jet head 240 to the fourth ink jet head 240, the image formed by the image data supplied from each page memory is an image provided by dividing a complete image, which will be finally formed, with the original points being at the same position, into the plural images; and accordingly, by overlapping the plural images with the respective original points being at the same position.

After that, rotation of the rotating member 210 is restarted, and thereby the can body 10 arrives at the second ink jet head 240 that functions as a second image forming portion. Then, as shown in FIG. 15B, the ink is ejected onto the outer circumferential surface of the can body 10 from the second ink jet head 240. Accordingly, an image by the ink of the second color is formed on the outer circumferential surface of the can body 10.

Here, in the exemplary embodiment, when ejection of ink from the second ink jet head 240 is started, the output from the rotary encoder is also grasped by the controller portion 500 that functions as the second obtaining unit, and thereby the rotation angle of the can body 10 is grasped (information related to the rotation angle of the can body 10 is obtained). Subsequently, the controller portion 500 subtracts the above-described reference angle from the rotation angle that has been grasped (hereinafter, referred to as "grasped angle"), to thereby obtain an angle difference. After that, the controller portion 500 starts reading of image data, beginning with the image data corresponding to the angle difference, of the image data stored in the page memory 700 that functions as a data storing portion (the above-described second page memory 700), and successively supplies the read image data to the second ink jet head 240.

To further describe, though the second ink jet head 240 starts to eject ink of the second color onto the can body 10 based on the grasped angle of the can body 10, the image data ejected onto the can body 10 by the second ink jet head 240 is image data starting from a reading position corresponding to the above-described angle difference, not the image data read from the original point of the above-described image data, and ink ejection is started based on the image data corresponding to the angle difference, and accordingly, an image by the ink of the second color is formed on the outer circumferential surface of the can body 10.

Figure 16:
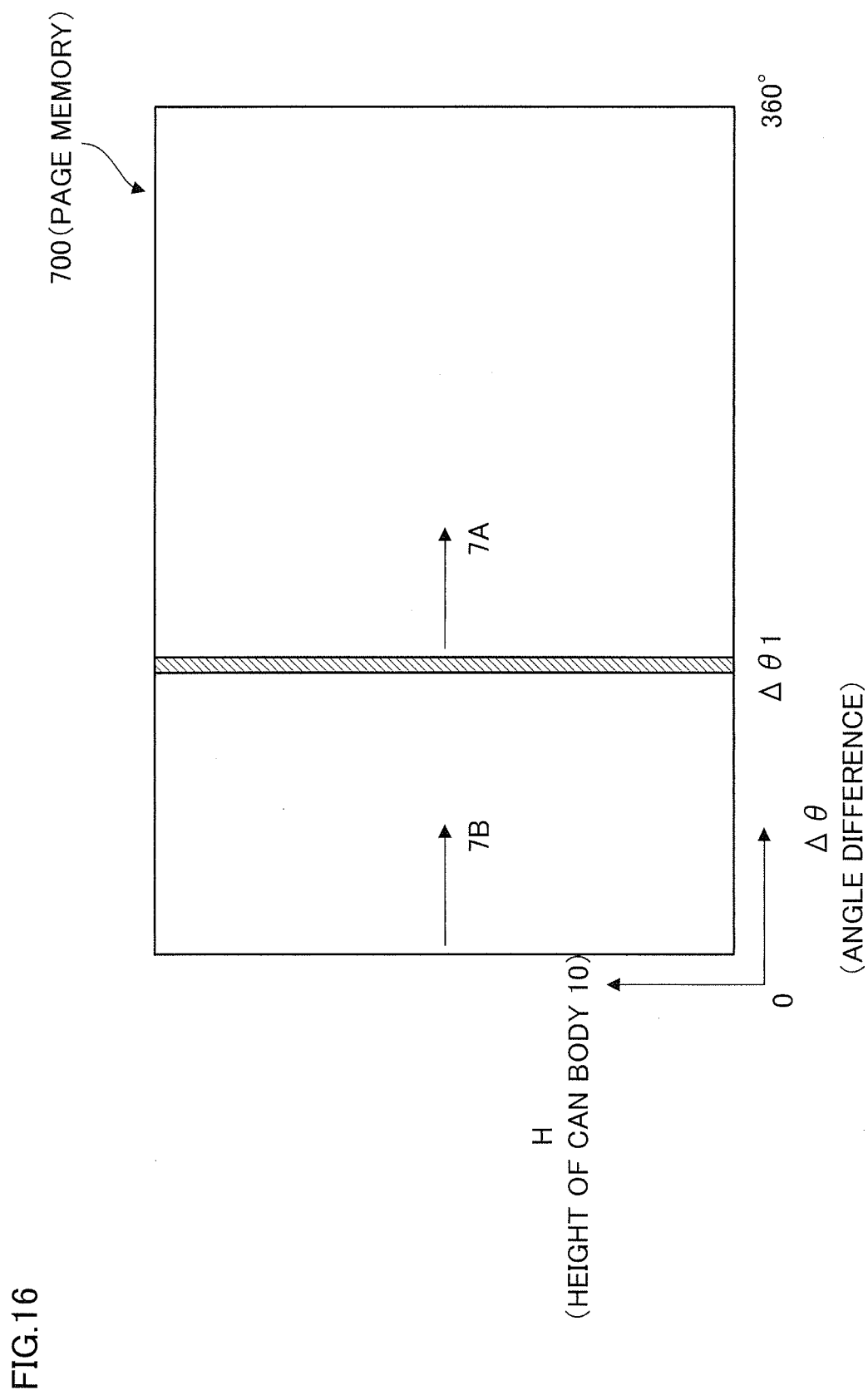
FIG. 16 is a diagram for illustrating reading of image data from a page memory.

To specifically describe with reference to FIG. 16 (a diagram for illustrating reading of the image data from the page memory 700), in a case where the angle difference $\Delta\theta$, which is obtained by subtracting the above-described reference angle from the above-described grasped angle, is $\Delta\theta 1$, for example, reading is performed beginning with the image data corresponding to $\Delta\theta 1$, of the image data stored in the page memory 700, and the read image data is supplied to the second ink jet head 240.

To additionally describe, the controller portion 500, which also functions as a determining unit, determines reading start position of the image data from the page memory 700 based on $\Delta\theta 1$, and starts reading beginning with image data existing at a reading start position having been determined. More specifically, image data is divided into segments by angles, and it is determined that the image data of one segment corresponding to $\Delta\theta 1$ (image data of one line, or image data of plural lines in a case where it is possible to form image of the plural lines at the same time by the second ink jet head 240) is read first, and then the image data of the one segment is read at the first place. Subsequently, the controller portion 500 supplies the read image data to the second ink jet head 240.

After that, as indicated by arrow 7A, image data of a segment adjacent to the image data corresponding to $\Delta\theta 1$ is read in turn, and the image data is supplied to the second ink jet head 240. Thereafter, as indicated by arrow 7B, the image data corresponding to the angle difference of 0° is read and image data of a segment adjacent to the image data is read in turn, and the read image data is successively supplied to the second ink jet head 240. Consequently, in the exemplary embodiment, as a means of making positional registration between the image formed by the first ink jet head 240 and the image formed by the second ink jet head 240, not by performing position control of the can body 10 by a mechanical driving system of the apparatus, but by changing the starting position of the image data to be read by the second ink jet head 240 in accordance with the computing process inside the controller portion 500, positional registration between the image formed by the first ink jet head 240 and the image formed by the second ink jet head 240 is performed, and thereby it becomes possible to carry out image formation onto the can body 10.

It should be noted that, though the description has been omitted above, when ink is ejected by the second ink jet head 240, there is a time lag between grasping of the rotation angle of the can body 10 and actual ink ejection. Then, in this case, there is a possibility that image forming positions are displaced. For this reason, for example, it is also possible to add an angle corresponding to the time lag to the angle difference obtained by subtracting the above-described reference angle from the above-described grasped angle to generate a new angle difference, and to determine the starting position of reading the image data from the page memory 700 based on the new angle difference.

Here, the positional registration between the image formed by the first ink jet head 240 and the image formed by the second ink jet head 240 is also able to be performed by, for example, starting rotation of the can body 10 after the can body 10 is once arranged to have the above-described reference angle, and successively supplying the image data to the second ink jet head 240, beginning with the image data corresponding to the reference angle, of the image data.

To additionally describe, when image formation by the second ink jet head 240 is performed, the support cylinder 232 is rotated so that the rotation angle of the can body 10 becomes the above-described reference angle, and thereafter, of the image data stored in the page memory 700, beginning with the image data corresponding to the reference angle (for example, of the image data, image data corresponding to 0° (the angle difference $\Delta\theta$ is 0°)), the image data is supplied to the second ink jet head 240, and thereby it becomes possible to perform positional registration between the image formed by the first ink jet head 240 and the image formed by the second ink jet head 240.

By the way, in this case, for setting the rotation angle of the can body 10 as the above-described reference angle, rotation control (position control) of the support cylinder 232 becomes necessary, and thereby, it takes time to start the image formation by the second ink jet head 240. Then, in this case, the number of the can bodies 10 on which images can be formed per unit time is decreased.

Moreover, in the case where the rotation angle of the support cylinder 232 is set to the above-described reference angle, rotation control of the support cylinder 232 is required, and thereby control becomes complicated. Moreover, in the case of performing rotation control of the support cylinder 232, it is required to control the support cylinder 232, which is a substance having a weight to some extent, and then, by an inertial effect, accuracy in the stop position of the support cylinder 232 tends to be deteriorated. Moreover, since the support cylinder 232 has a weight to some extent, to control the support cylinder 232 in a short time, it is necessary to select a high-power motor, and accordingly, there is a possibility of causing increase of power consumption or increase of costs. Moreover, in the case of using the high-power motor, upsizing of the apparatus is apt to be caused.

On the other hand, in the exemplary embodiment, the position control of the can body 10 is not performed (the can body 10 is not rotated to have the reference angle), but the state of the can body 10 is grasped, and in accordance with the state of the can body 10, the image data with which reading is started is changed. To additionally describe, the position control of the can body 10 is not performed, but, in accordance with the rotation angle of the can body 10, the starting position of the image data of the image to be formed is changed. Accordingly, no burden is placed on the mechanical driving system of the apparatus. Moreover, since only the computing process by the controller portion 500 is needed, the position control of the can body 10 becomes unnecessary, and accordingly, inconveniences described above are unlikely to occur. Moreover, in the exemplary embodiment, it becomes possible to maintain the can body 10 in a state of rotating at a constant speed (a state where the can body 10 rotates at a constant speed), and accordingly, deterioration in accuracy caused by the rotation control of the can body 10 becomes unlikely to occur.

On the other hand, in a case where the can body 10 is not rotated at a constant speed, control of the second ink jet head 240 becomes complicated, such as changing ejection frequency of the ink ejected by the second ink jet head 240 in conformity to the rotation speed, and accordingly, deterioration in accuracy caused by the rotation control of the can body 10 becomes likely to occur.

It should be noted that, in the exemplary embodiment, image data is stored in the page memory 700, and the image data is also stored in the page memory 700 in a state where an angle difference and image data of one segment are associated with each other. In such a case, it becomes possible to read image data immediately in response to an angle difference, and it becomes possible to increase the processing speed in image formation.

It should be noted that, other than the method of storing the image data in the page memory 700 while associating the angle difference with the image data of one segment, it is also possible to store the image data in the page memory 700 while associating a position along the circumferential direction of the can body 10 (a position specified by a distance) with the image data of one segment. It should be noted that, in this case, a conversion table for converting the above-described angle difference into the position along the circumferential direction of the can body 10 is prepared in advance, and the angle difference is converted into the distance by use of the table. Then, based on the distance obtained by the conversion, reading of image data from the page memory 700 is performed.

It should be noted that, in the above description, the process in forming the image on the can body 10 by the second ink jet head 240 has been described; however, when the image is formed by the third ink jet head 240 (the same is true for the fourth ink jet head 240), the similar process is performed. That is, when ink ejection by the third ink jet head 240 is started, an output from the rotary encoder is grasped by the controller portion 500, and thereby the rotation angle of the can body 10 is grasped. Subsequently, the above-described reference angle is subtracted from the grasped angle, and thereby an angle difference is obtained. After that, of the image data stored in the page memory 700, reading of the image data is started from the image data corresponding to the angle difference, and the image data is supplied to the third ink jet head 240 in turn.

It should be noted that, in the above description, the angle in starting image formation by the first ink jet head 240 was the above-described reference angle (in this case, the reference angle is different in each of the can bodies 10); however, it is also possible to perform position control of the can body 10 when the image is formed by the first ink jet head 240 and to set a predetermined constant angle as the reference angle. It should be noted that, in this case, the reference angle is the same in each of the can bodies 10.

Moreover, for example, it is also possible to predict the angle difference when the can body 10 arrives at the third ink jet head 240 based on the above-described angle difference obtained when the can body 10 arrives at the second ink jet head 240. To describe more specifically, in the exemplary embodiment, the distance (arranging interval) between the first ink jet head 240 and the second ink jet head 240 and the distance (arranging interval) between the second ink jet head 240 and the third ink jet head 240 are equal, and moreover, the can body 10 rotates at a constant speed. Accordingly, in the exemplary embodiment, by doubling the above-described angle difference obtained when the can body 10 arrives at the second ink jet head 240, the angle difference when the can body 10 will arrive at the third ink jet head 240 is able to be predicted. It should be noted that the angle difference when the can body 10 will arrive at the fourth ink jet head 240 is able to be predicted by trebling the above-described angle difference obtained when the can body 10 arrives at the second ink jet head 240.

It should be noted that it is possible to perform a process for correcting the above-described angle difference obtained by prediction. To describe specifically, for example, in a case where, when the first can body 10 (a preceding can body 10) is conveyed, there is a difference between the predicted angle difference and the angle difference obtained by actual measurement, a correction process on the predicted angle difference is able to be executed when the second can body 10 (a following can body 10) is conveyed. More specifically, it is also possible to correct the predicted angle difference of the second can body 10 by adding a difference between the predicted angle difference of the first can body 10 and the actual measured angle difference of the first can body 10 to the predicted angle difference (the predicted angle difference of the second can body 10). In this case, prediction accuracy of the angle difference is improved. The correction in this case is able to be performed by hastening or delaying timing for starting ink ejection from the ink jet heads 240, other than the method of changing the reading position of the image data.

Figure 17A:
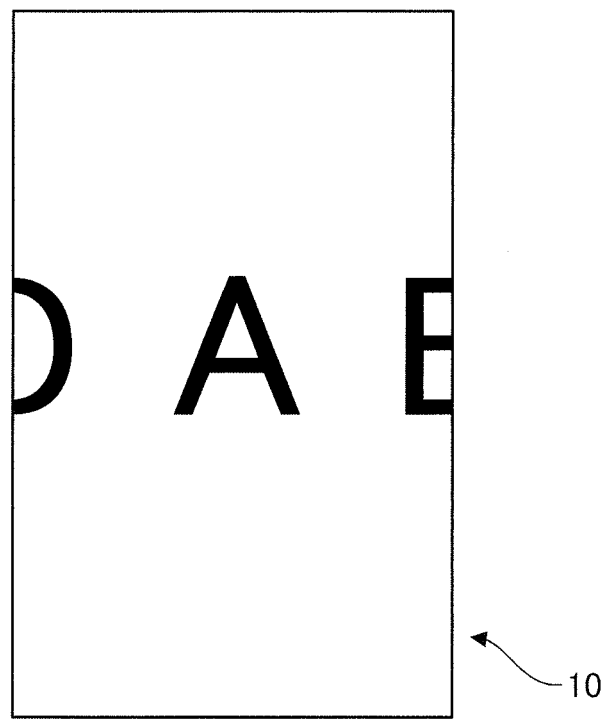
FIGS. 17A and 17B are diagrams showing an example of an image formed on a can body.
Figure 17B:
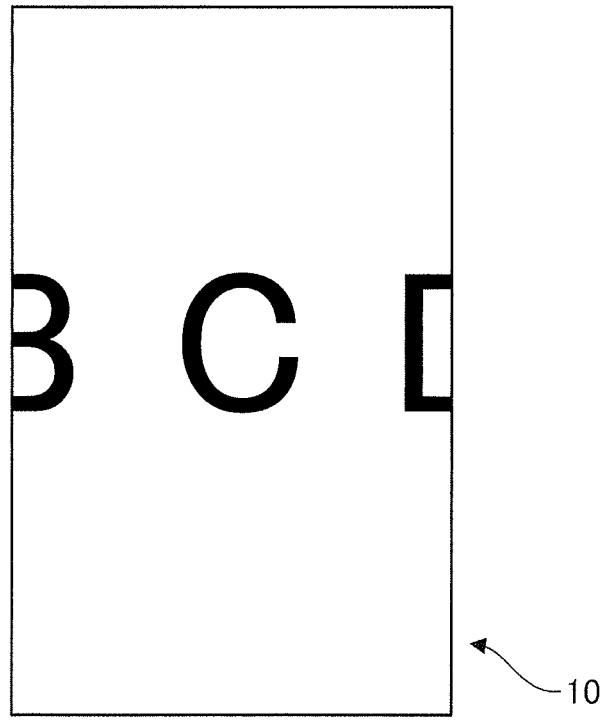

A more detailed description will be further given by use of a specific example shown in FIGS. 17A and 17B and 18.

It should be noted that, in the specific example, a description will be given of a case where an image (four characters "A", "B", "C" and "D" are arranged in order and each character is formed in plural colors) shown in FIGS. 17A and 17B (diagrams showing an example of the image formed on the can body 10) is formed on the can body 10 as an example. Here, FIG. 17A is a front elevation view of the can body 10, and FIG. 17B is a back elevation view of the can body 10.

Moreover, in this specific example, as shown in FIGS. 18A and 18B (diagrams showing a process example of the image forming process on the can body 10), a description will be given of a process when image formation is performed by the second ink jet head 240. It should be noted that FIG. 18A is a diagram showing a process example in a case where position control of the can body 10 is carried out and then the image is formed on the can body 10 (a comparative example), and FIG. 18B is a diagram showing a process example of the exemplary embodiment.

To additionally describe, a print image "A", "B", "C", "D" shown in FIGS. 18A and 18B are an image, and is not necessarily seen as "A", "B", "C", "D". Actually, the image "A", "B", "C", "D" formed as a complete image is divided for the plural ink jet heads, and of these, an image that the second ink jet head 240 is in charge of is formed on the can body 10. Consequently, the image that the second ink jet head 240 is in charge of, which is a part of the complete image, is seen. To further describe, in this case, on the can body 10, on which an image that the first ink jet head 240 is in charge of has already been formed, the image that the second ink jet head 240 is in charge of is formed; and therefore, an image in which images that the first ink jet head 240 and the second ink jet head 240 are in charge of are superposed is seen.

In the case of the comparative example shown in FIG. 18A, as described above, image formation by the second ink jet head 240 is started from the state where rotation control of the can body 10 is performed and the can body 10 is arranged at the above-described reference angle. For example, in a case where image formation by the first ink jet head 240 is started from a position of an end portion of the character "A", as indicated by the reference sign A1 in FIG. 18A, image formation is also started from the position of the end portion of the character "A" in the second ink jet head 240.

On the other hand, in the exemplary embodiment, image formation is started even though the can body 10 is arranged at an angle other than the reference angle. To describe with reference to the specific example of FIG. 18B, for example, even though image formation by the first ink jet head 240 has been started from the position of the end portion of the character "A", if the character "A" faces in a different direction when the can body 10 arrives at the second ink jet head 240, image formation is started from the character "C", not the character "A", as indicated by the reference sign B1 in FIG. 18B.

It should be noted that, in the example shown in FIG. 18A, image formation is performed from the character "A", and until the can body 10 is rotated 360°, the characters "B", "C" and "D" are further formed. Moreover, in the example shown in FIG. 18B, image formation is performed from the character "C", and until the can body 10 is rotated 360°, the characters "D", "A" and "B" are further formed. It should be noted that, in this example, the description has been given of the case where the can body 10 is rotated 360°; however, the can body 10 is able to be rotated over 360°. In this case, one end portion and the other end portion of the image to be formed come to be superposed.

Here, in the exemplary embodiment, image formation is performed so that the can body 10 is covered with an image having a cylindrical shape, in other words, a sleeve-shaped image with a range of W (the length in the height direction)× θ(the rotation angle (the rotation position)), not to wrap a sheet-shaped image with a range of W (the length in the height direction)×L (the length in the circumferential direction) around the can body 10. For this reason, in the exemplary embodiment, the image data is converted into the image data having a cylindrical shape of W×θ, not into the image having a plane shape of W×L, in advance. It should be noted that it is also preferable to prepare a conversion program that converts, upon inputting a diameter or the like of the can body 10, the image data having the plane shape of W×L into the image data having the cylindrical shape of W×θ in advance. In this case, it becomes possible to reduce a preparation time.

Moreover, in the exemplary embodiment, the can body 10 is rotated independent of the ink jet heads 240, and at the time point when the can body 10 is rotated 360° after ejection of ink by the ink jet heads 240 is started, the ink jet heads 240 stop ink ejection to finish the printing. Consequently, in the exemplary embodiment, superimposing of images caused by differences in the circumferential lengths of the can bodies 10 does not occur. In general, there are variations in the outer diameter of the can body 10, and in response thereto, there are also variations in the circumferential length of the can body 10. Moreover, at present, image formation onto the can body 10 is performed by lithographic plate printing in many cases. Here, in the case where there are variations in the circumferential length and image formation is performed by the lithographic plate printing, a situation in which a length in the circumferential direction from a print start portion to a print end portion becomes longer than the circumferential length of the can body 10 occurs, and in this case, the image of the print start portion and the image of the print end portion are superposed. Incidentally, in this case, there is a possibility of causing damage to appearance of the can body 10.

On the other hand, in the exemplary embodiment, as described above, the can body 10 is rotated 360° independent of the ink jet heads 240, and at the time point when the can body 10 is rotated 360°, rotation of the can body 10 is finished. Therefore, no image is formed on the portion over 360°, and superposition of the image of the print start portion and the image of the print end portion does not occur. Then, in this case, it becomes possible to suppress deterioration of appearance of the can body 10. Moreover, in the case where the image of the print start portion and the image of the print end portion are superposed, consumed ink is increased; however, in the case of the exemplary embodiment, an amount of use of ink is reduced because there is no superposition.

Here, a further description will be given of the image forming process performed in the exemplary embodiment by using FIG. 19 (a diagram showing the image forming process of the exemplary embodiment).

Figure 19A:
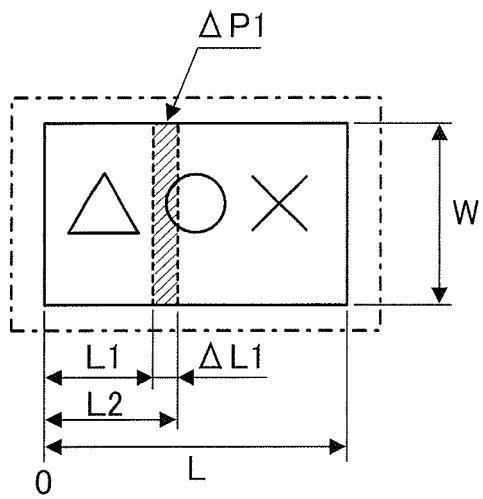
FIGS. 19A and 19B are diagrams showing an image forming process of an exemplary embodiment.

Here, a frame indicated by a dot-and-dash line in FIG. 19A shows an original image, and a frame indicated by a solid line shows a formed image (a print image) to be formed on the can body 10. Moreover, "W" in FIG. 19A indicates the length of the can body 10 in the height direction. Moreover, "L" in the figure indicates the circumferential length of the can body 10.

There are variations in the circumferential length of the can body 10, and in the case of the lithographic plate printing and the long circumferential length of the can body 10, there is a possibility of generating a gap between the formed image of the print start portion and the formed image of the print end portion. Consequently, in the case of the lithographic plate printing, a redundant length (α) (not shown) is provided to make the length of the formed image longer than the circumferential length of the can body 10. In other words, the length of "L" in the figure is changed to "L+α". By the way, in this case, as described above, an end portion of the formed image of the print start portion and an end portion of the formed image of the print end portion come to be superposed, and there is a possibility of causing damage to the appearance of the can body 10. Moreover, in this case, an amount of consumption of ink is increased.

Next, the exemplary embodiment will be described with reference to FIG. 19B. It should be noted that (I) in FIG. 19B, similar to the above description, indicates the original image and the formed image to be actually formed. Moreover, (II) indicates a state where only the formed image is extracted. Moreover, (IV) indicates the conversion of the plane-shaped formed image extracted in (II) into the sleeve-shaped formed image, which is of a cylindrical shape, by way of modeling. It should be noted that (III) in the figure indicates a process from (II) in the figure to (IV) in the figure.

Further, (V) in the figure indicates the image data outputted to the ink jet heads 240. Here, in a case where it is assumed that a position of an arbitrary rotation direction is 0 point (original point), the rotation angle when the can body 10 in the state of rotating θ1 (radian) is rotated to θ2 (radian) is Δθ1 (radian), and further, a radius of the can body 10 is R, the image to be formed on the outer circumferential surface of the can body 10 when the can body 10 is rotated Δθ1 becomes an image within a region of R×Δθ1×W.

Figure 19B:
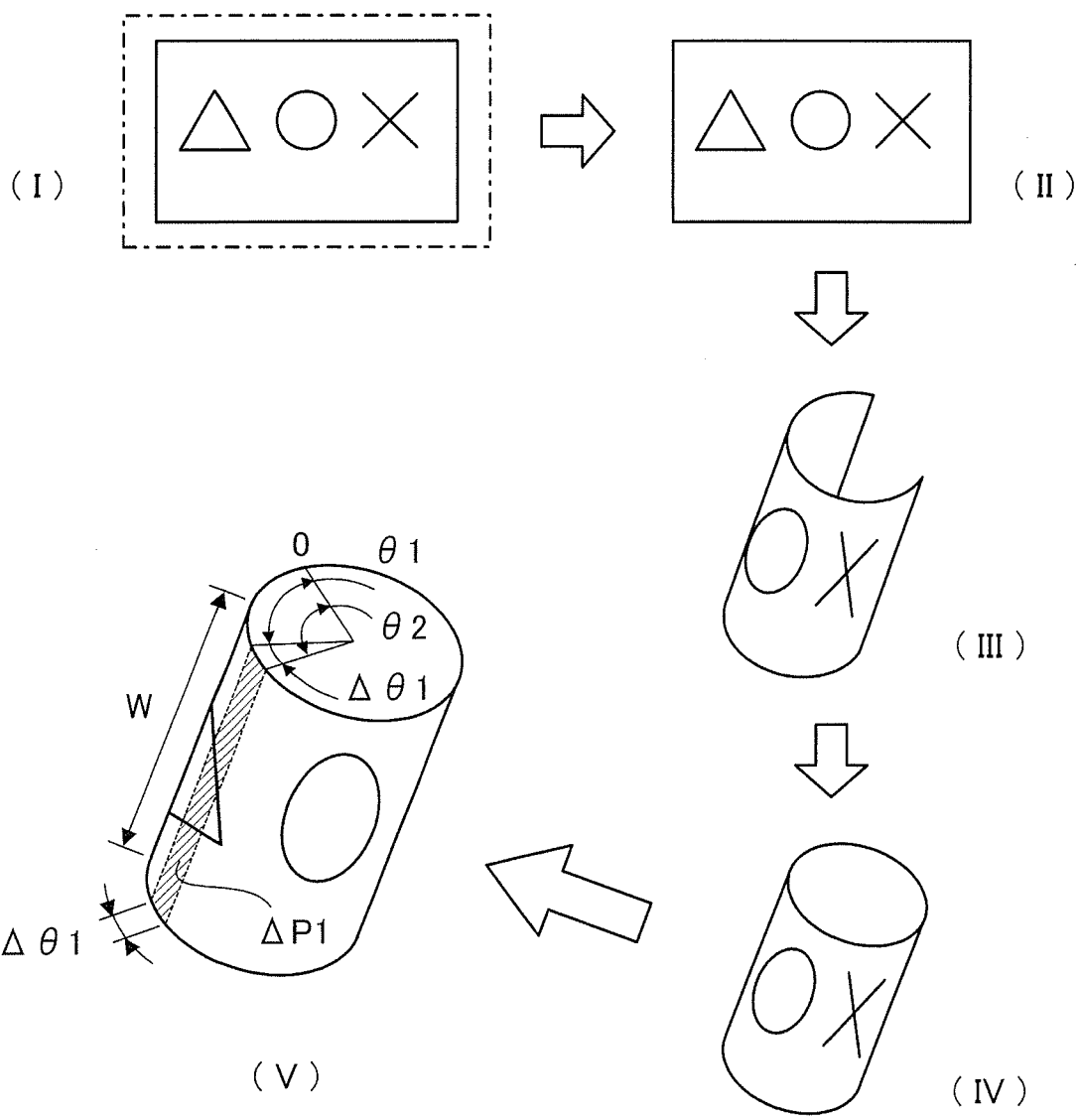

In the image forming process of the exemplary embodiment, since image formation is able to be started from an arbitrary rotation position, it is also possible to start image formation from the position of θ2 in (V) in FIGS. 19A and 19B. Moreover, in the exemplary embodiment, as described above, the position to finish printing is a position where the can body 10 makes one rotation (360°) from a position to start rotating, and accordingly, superposition of images does not occur. It should be noted that, in the case where the circumferential length of the can body 10 is large, a distance between an image of one segment formed by the ink jet heads 240 and an image adjacent to the image is large, and in the case where the circumferential length of the can body 10 is small, a distance between an image of one segment formed by the ink jet heads 240 and an image adjacent to the image is small, and further, with respect to ink dots formed by arriving of droplets of ink ejected by the ink jet heads 240 at the barrel surface of the can, in the case where the circumferential length of the can body 10 is large, a distance between the ink dots adjacent in the circumferential length direction is large, and in the case where the circumferential length of the can body 10 is small, the distance is small, conversely. However, this is a description in a case of viewing microscopically, and it is difficult to be distinguished by the naked eye. In this manner, though the image density is increased or decreased in accordance with the circumferential length of the can body 10, anyway, the above-described superposition of images does not occur.

REFERENCE SIGNS LIST

1C . . . Can-body receiving position
1D . . . Can-body discharging position
10 . . . Can body
100 . . . Image forming system
200 . . . Image forming apparatus
210 . . . Rotating member
232 . . . Support cylinder
240 . . . Ink jet head
300 . . . Can-body supply mechanism
310 . . . Duct
400 . . . Can-body discharge mechanism
411 . . . Holding pad
500 . . . Controller portion
700 . . . Page memory

The invention claimed is:

1. An image forming system comprising:
a first image forming portion that forms an image on an outer circumferential surface of a can body rotating in a circumferential direction;
a first obtaining unit that obtains information related to rotation angle of the can body when image formation by the first image forming portion is started;
a second image forming portion that forms an image on the can body rotating in the circumferential direction after the image is formed on the can body by the first image forming portion;
a second obtaining unit that obtains information related to rotation angle of the can body when image formation by the second image forming portion is started;
a data storing portion that stores image data of the image formed by the second image forming portion; and
a determination unit that determines a starting position of reading of image data used by the second image forming portion based on the information related to the rotation angle obtained by the first obtaining unit and the information related to the rotation angle obtained by the second obtaining unit,
wherein the second image forming portion forms an image on the outer circumferential surface of the can body rotating in the circumferential direction by use of the image data successively being read from the starting position of reading determined by the determination unit.

2. The image forming system according to claim 1, wherein the determination unit determines the starting position of reading based on an angle difference, which is a difference between a rotation angle specified by the information related to the rotation angle obtained by the first obtaining unit and a rotation angle specified by the information related to the rotation angle obtained by the second obtaining unit.

3. The image forming system according to claim 1, further comprising:
a rotating unit that rotates the can body in the circumferential direction,
wherein the rotating unit rotates the can body with a constant speed, without increasing or decreasing the rotation speed of the can body, during a period from starting of image formation by the first image forming portion to completion of image formation by the second image forming portion.

4. The image forming system according to claim 1, wherein the first image forming portion and the second image forming portion form an image on the outer circumferential surface of the can body by ejecting ink from above the can body in a lying state.

5. The image forming system according to claim 1, wherein the first image forming portion and the second image forming portion are arranged at positions different from each other,
the image forming system comprises a moving unit that moves the can body to pass through each of the first image forming portion and the second image forming portion while rotating the can body in the circumferential direction, and
the can body, which moves to pass through each of the first image forming portion and the second image forming portion while rotating in the circumferential direction, performs the movement while rotating with a constant speed without increasing or decreasing the rotation speed thereof.

* * * * *